United States Patent
Amerga et al.

(10) Patent No.: US 7,039,418 B2
(45) Date of Patent: May 2, 2006

(54) POSITION DETERMINATION IN A WIRELESS COMMUNICATION SYSTEM WITH DETECTION AND COMPENSATION FOR REPEATERS

(75) Inventors: Messay Amerga, San Diego, CA (US); Christopher Patrick, San Diego, CA (US); Roland Rick, San Diego, CA (US); Douglas N. Rowitch, Del Mar, CA (US); Saed Younis, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 451 days.

(21) Appl. No.: 09/922,997

(22) Filed: Aug. 3, 2001

(65) Prior Publication Data
US 2002/0115448 A1    Aug. 22, 2002

Related U.S. Application Data

(60) Provisional application No. 60/249,846, filed on Nov. 16, 2000.

(51) Int. Cl.
*H04Q 7/20* (2006.01)

(52) U.S. Cl. .................. 455/456.1; 342/450; 342/453; 370/313; 370/315

(58) Field of Classification Search ............ 455/456.1, 455/456.2, 456.3, 404.1, 404.2, 432.1, 436, 455/442, 407, 408, 7, 11.1, 13.1, 16; 342/387, 342/464, 450, 453, 457; 370/242, 243, 313, 370/315, 492, 501
See application file for complete search history.

(56) References Cited

U.S. PATENT DOCUMENTS

| | | | |
|---|---|---|---|
| 5,303,393 A * | 4/1994 | Noreen et al. | 455/3.02 |
| 5,734,977 A * | 3/1998 | Sanmugam | 455/410 |
| 6,081,229 A | 6/2000 | Soliman et al. | 342/357.05 |
| 6,108,364 A | 8/2000 | Weaver, Jr. et al. | 375/130 |
| 6,201,497 B1 * | 3/2001 | Snyder et al. | 342/357.06 |

(Continued)

FOREIGN PATENT DOCUMENTS

GB    2346511    9/2000

(Continued)

OTHER PUBLICATIONS

Bavafa, et al., "Repeaters For CDMA Systems", Vehicular Technology Conference, May 1998, pp. 1161-1165.

*Primary Examiner*—CongVan Tran
(74) *Attorney, Agent, or Firm*—Philip Wadsworth; Bruce W. Greenhaus; Andrea L. Mays

(57) ABSTRACT

Techniques to detect whether or not a remote terminal is under the coverage of a repeater within a wireless communication network, which may be based on (1) a list of base stations expected to be received while under the repeater's coverage, (2) the characterized environment of the repeater, and/or (3) the propagation delays for a transmission received at the remote terminal. Additional ambiguity resulting from being under a repeater's coverage may also be accounted for and/or compensated by (1) discarding time measurements from repeated base stations, (2) adjusting the processing for position estimation to account for the additional ambiguity due to the repeater, (3) computing a series of position estimates based on multiple transmissions received from the same originating base station and selecting the best estimate, and/or (4) computing a series of position estimates based on multiple transmissions from multiple originating base stations and selecting the best estimate.

45 Claims, 17 Drawing Sheets

U.S. PATENT DOCUMENTS

| | | | |
|---|---|---|---|
| 6,211,819 B1 * | 4/2001 | King et al. | 342/357.09 |
| 6,236,365 B1 * | 5/2001 | LeBlanc et al. | 342/457 |
| 6,249,252 B1 * | 6/2001 | Dupray | 342/450 |
| 6,408,178 B1 * | 6/2002 | Wickstrom et al. | 455/427 |
| 6,429,808 B1 * | 8/2002 | King et al. | 342/357.02 |
| 6,453,237 B1 * | 9/2002 | Fuchs et al. | 455/456.1 |
| 6,961,367 B1 * | 11/2005 | Simic et al. | 375/214 |
| 2003/0157943 A1 * | 8/2003 | Sabat, Jr. | 455/456 |
| 2003/0220075 A1 * | 11/2003 | Baker et al. | 455/17 |
| 2004/0097190 A1 * | 5/2004 | Durrant et al. | 455/7 |
| 2004/0147221 A1 * | 7/2004 | Sheynblat et al. | 455/12.1 |
| 2005/0130672 A1 * | 6/2005 | Dean et al. | 455/456.1 |
| 2005/0221754 A1 * | 10/2005 | Poykko | 455/11.1 |

FOREIGN PATENT DOCUMENTS

| | | |
|---|---|---|
| WO | 0133302 | 5/2001 |
| WO | 0148506 | 7/2001 |
| WO | 0217669 | 2/2002 |

* cited by examiner

POSITION DETERMINATION IN A WIRELESS COMMUNICATION SYSTEM WITH DETECTION AND COMPENSATION FOR REPEATERS

RELATED APPLICATIONS

This application claims priority to U.S. Provisional Application No. 60/249,846, filed Nov. 16, 2000.

BACKGROUND OF THE INVENTION

1. Field of the Invention

The present invention relates to communication. More particularly, the present invention relates to a novel and improved method and apparatus for determining position of a remote terminal in a wireless communication system, wherein repeaters are detected and compensated.

2. Description of the Related Art

Wireless communication systems are widely employed to support communication for a large number of users. Such systems include CDMA, TDMA (e.g., GSM), and other commonly deployed systems. In a wireless communication system, a user on one remote terminal is able to communicate with another user on another remote terminal (or a wireline unit) via a wireless link to a base station. Each base station is designed to coordinate and facilitate the communication between the remote terminals within its coverage area.

Some wireless communication networks employ repeaters to provide coverage for designated areas within the network or to extend the coverage of the network. For example, a repeater may be used to cover a particular region within a network not covered by a base station due to fading conditions (i.e., a hole within the network). Repeaters may also be used to extend coverage into rural areas (e.g., along a freeway) that are outside the coverage area of the base stations.

A repeater is a high-gain bi-directional amplifier placed in a network to receive, amplify, and retransmit a modulated signal. On the forward link, a signal from a "donor" sector (also referred to as a serving base station) is provided to the repeater via a directive antenna or a cable (e.g., a coaxial or fiber optic cable). The repeater then filters, amplifies, and retransmits the donor signal to the remote terminals in the repeater's coverage area. Correspondingly, on the reverse link, the repeater receives signals from the remote terminals within its coverage area, conditions and retransmits the signals to the base station.

Besides facilitating communication between users, a wireless communication system may be designed with the capability to determine the position of a remote terminal. In fact, the Federal Communications Commission (FCC) has mandated support for an enhanced emergency 911 (E-911) service whereby the location of a remote terminal in a 911 call is required to be sent to a Public Safety Answering Point (PSAP).

For position determination, a remote terminal within a wireless communication system typically measures the arrival times of the transmissions from a number of base stations. The differences between the signal arrival times can be computed and translated into pseudo ranges, which are then used to determine the position of the remote terminal.

Various challenges are encountered in measuring the signal arrival times in a network that employs repeaters. These repeaters introduce additional delays in the remote terminal's time measurements, with the amount of additional delays being unknown in many instances. The additional delays typically cannot be accurately compensated for by the network because it may not be known with certainty whether or not a remote terminal is under the coverage of a repeater. This uncertainty in the sources for the time measurements can result in an inaccurate estimate of the remote terminal's position and/or an increase in the processing required by the remote terminal to determine its position.

Therefore, it is highly desirable to develop techniques that can detect whether or not a remote terminal is under the coverage of a repeater, and to possibly account for the additional delays introduced by the repeater, in determining the position of the remote terminal. These techniques may lead to improved accuracy in the estimated position of the remote terminal and may further reduce the amount of processing required for position determination.

SUMMARY OF THE INVENTION

The invention provides various techniques to detect whether a remote terminal is under the coverage of a repeater within a network so that the processing to estimate the remote terminal's position can account for the additional ambiguity typically associated with the repeater. In accordance with various aspects of the invention, a determination of whether the remote terminal is under the coverage of a repeater may be achieved based on (1) a list of base stations expected to be received while under the coverage of the repeater (i.e., a probable neighbor list) versus a list of base stations actually received by the remote terminal, (2) the characterized environment of the repeater, (3) the propagation delays for a transmission received at the remote terminal, (4) some other criteria, or (5) a combination thereof.

The invention further provides techniques to account and/or compensate for the additional ambiguity resulting from being under the coverage of a repeater. In one aspect, time measurements from repeated base stations may be discarded and not used to estimate the remote terminal's position. In another aspect, the processing to estimate the remote terminal's position may be adjusted to account for the additional ambiguity (e.g., a search window may be widened). In yet another aspect, more than one multipath received from the same originating base station by the remote terminal may be used to compute a series of position estimates for the remote terminal, and the most likely estimate is selected.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
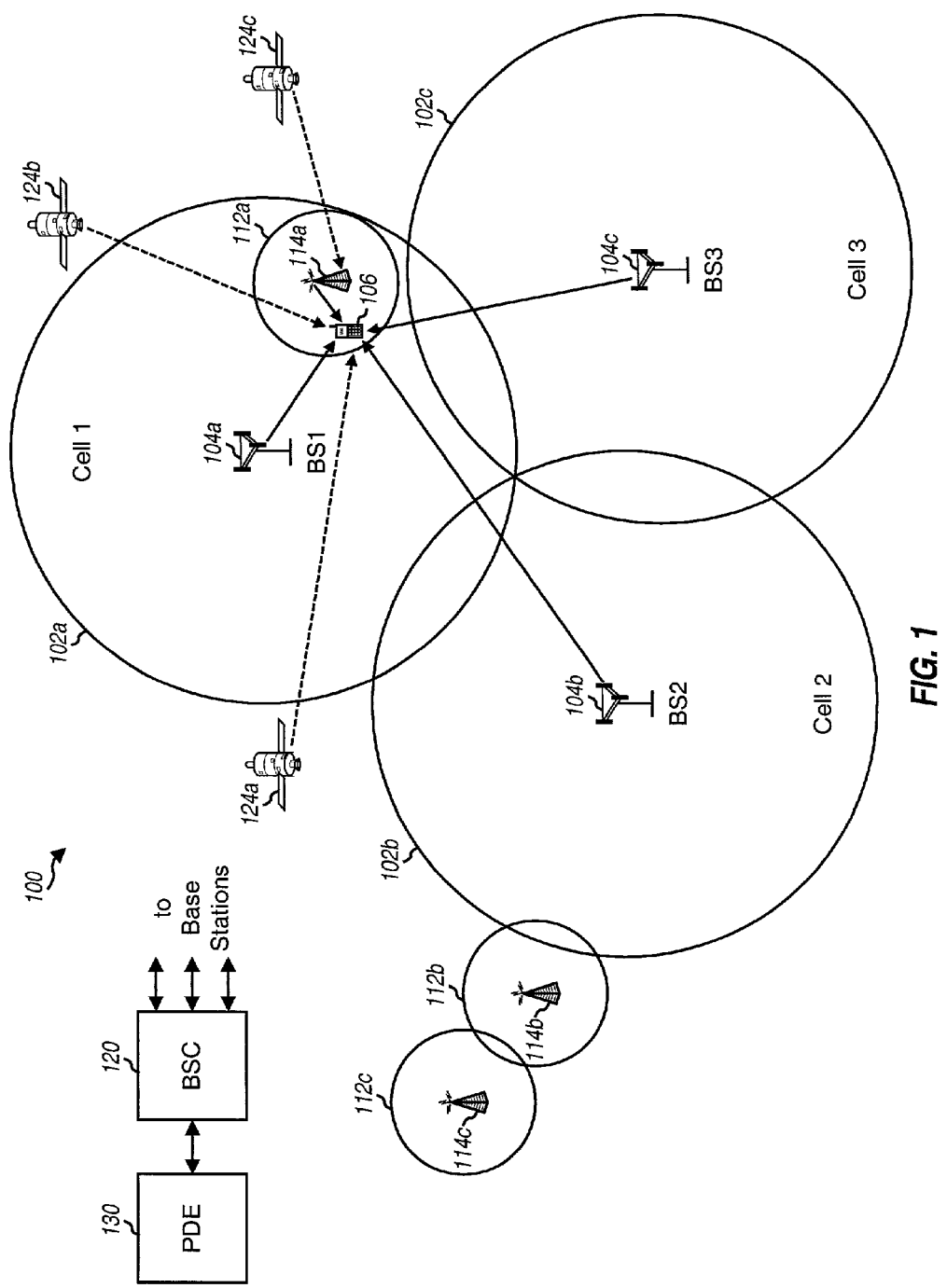
FIG. 1 is a diagram of a wireless communication network that employs repeaters and supports a number of users.

FIG. 1 is a diagram of a wireless communication network 100 that employs repeaters and supports a number of users. Network 100 may be designed to conform to one or more commonly known CDMA standards, such as IS-95, W-CDMA, cdma2000, other standards, or a combination thereof. Network 100 includes a number of base stations 104, with each base station serving a particular coverage area 102. Only three base stations 104a through 104c are shown in FIG. 1 for simplicity. The base station and its coverage area are often collectively referred to as a cell.

One or more repeaters 114 may be employed with a particular base station 104 to provide coverage for regions within the cell that would not otherwise be covered due to fading conditions (such as region 112a shown in FIG. 1) or to extend the coverage of a network (such as regions 112b and 112c). Each repeater 114 couples directly or through another repeater to an associated base station 104 via a wireless or wireline link (e.g., a coaxial or fiber optic cable). Any number of base stations within the network may be repeated, depending on the particular network design.

A number of remote terminals 106 are typically dispersed throughout the network (only one terminal is shown in FIG. 1 for simplicity). Each remote terminal 106 may communicate with one or more cells on the forward and reverse links at any moment, depending on whether the remote terminal is in soft handoff. Typically, one of the cells (e.g., cell 1) is designated as the serving cell (i.e., the reference cell) and the other cells are neighbor cells.

A number of base stations 104 typically couple to a base station controller (BSC) 120 that coordinates the communication for these base stations. For position determination, base station controller 120 typically couples to a Position Determining Entity (PDE) 130 that receives time measurements from the remote terminals and provides control and other information related to position determination, as described in further detail below.

For position determination, remote terminal 106 measures the arrival times of the transmissions from a number of base stations 104. For a CDMA network, these arrival times can be determined from the phases of the pseudo-noise (PN) codes used by the base stations to spread the signals prior to transmission to the remote terminal. The PN phases detected by the remote terminal are then reported to PDE 130 via (e.g., IS-801) signaling. PDE 130 then uses the reported PN phase measurements to determine pseudo-ranges, which are then used to determine the position of the remote terminal.

The position of remote terminal 106 may be determined using a hybrid scheme whereby signal arrival times (i.e., times of arrival (TOA)) are measured for one or more base stations 104 and one or more Global Positioning System (GPS) satellites 124. The time measurements for the GPS satellites can be used as the primary measurements or to supplement the time measurements for the base stations. The time measurements for GPS satellites are typically more accurate than those from the base stations but require clear line-of-sight to the satellites. Thus, the use of GPS may be limited to outdoor use where obstructions may not be present, and is typically not available for use indoors or in applications where there are obstructions such as foliage or buildings. However, GPS has extensive coverage and four or more GPS satellites can (potentially) be received from virtually anywhere.

In contrast, base stations are typically located in populated areas but their signals are able to penetrate some buildings and obstructions. Thus, the base stations may be advantageously used to determine position within cities and (potentially) within buildings. However, the time measurements for the base stations are typically less accurate because multiple signals may be received at the remote terminal from a particular base station due to multipath.

In the hybrid scheme, each base station and each GPS satellite represents a transmission node. To determine the position of the remote terminal, transmissions from three or more non-spatially aligned nodes (base stations and/or satellites) are processed. A fourth node may be used to provide altitude and may also provide increased accuracy (i.e., reduced uncertainty in the measured arrival times). The signal arrival times can be determined for the transmission nodes and used to compute pseudo-ranges, which can then be used (e.g., via a trilateration technique) to determine the position of the remote terminal. Position determination can be achieved in accordance with the techniques described in the aforementioned 3GPP 25.305, TIA/EIA/IS-801, and TIA/EIA/IS-817 standard documents and in U.S. Pat. No. 6,353,412.

In accordance with an aspect of the invention, remote terminal 106 detects the signal arrival times for base stations 104 and reports the time measurements to PDE 130. PDE 130 in turn uses the measurements to determine an initial estimate of the possible positions of remote terminal 106 and may further instruct the remote terminal to use a set of time windows to search for transmissions from a set of GPS satellites 124. The search windows are determined by PDE 130 based on the measurements from remote terminal 106 and possibly from additional information available to the PDE. Generation of the search windows is described in further detail below.

Each GPS satellite 124 continually transmits a message that includes the time at which the message was transmitted. The message is spread with a pseudo-noise (PN) code having a specific length and offset assigned to the GPS satellite. The remote terminal receives the GPS transmission, despreads the received signal with the same PN code, but at various time offsets within a particular range defined by the search window, and recovers the message. The PN offset used by the remote terminal to recover the GPS transmission is indicative of the time difference between the GPS satellite and the remote terminal, and is also indicative of the signal arrival time.

The remote terminal typically searches within a particular search window (i.e., a particular range of PN offsets) in an attempt to recover the GPS transmission. A larger search window translates to longer search time, which may be used to ensure that a GPS transmission in a wider range of time offsets can be found by the remote terminal. Alternatively, a smaller search window translates to a shorter search time, which is more desirable, but requires additional information to indicate that the GPS transmission is likely to be found within that smaller range of time offsets.

In the example shown in FIG. 1, remote terminal 106 may receive transmissions from GPS satellites 124a through 124c, base stations 104b and 104c (and possibly base station 104a), and repeater 114. Remote terminal 106 measures the signal arrival times of the transmissions from the satellites, base stations, and repeater, and reports these time measurements to PDE 130 via BSC 120.

As noted above, repeaters can be used to provide coverage for regions not covered by the base stations. Repeaters are more cost effective than base stations, and can be advantageously deployed where additional capacity is not required (e.g., in rural areas). However, a repeater is associated with additional delays due to (1) circuitry within the repeater and (2) cabling and/or additional transmission associated with the repeater. As an example, surface acoustic wave (SAW) filters, amplifiers, and other components within the repeater introduce additional delays that are comparable to, or may be even greater than, the transmission delays from the base station to the remote terminal.

Figure 2A:
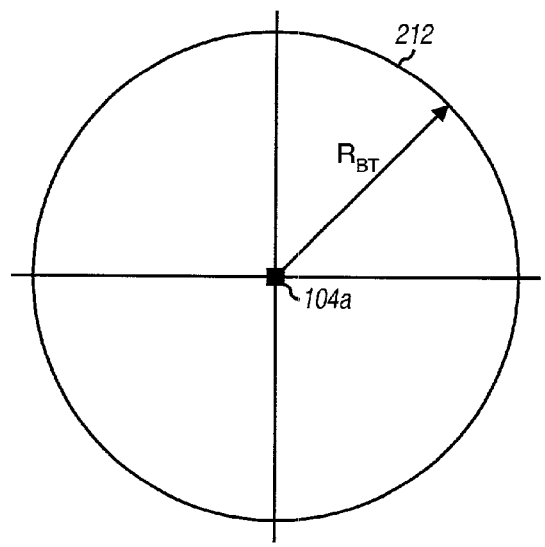
FIGS. 2A and 2B are diagrams showing the possible positions of a remote terminal based on a transmission received from a base station and a repeated base station, respectively.

FIG. 2A is a diagram showing the possible positions of a remote terminal based on a transmission received from a base station that does not employ a repeater. The arrival time of a transmission from the base station can be measured and translated into a range $R_{BT}$, which is represented by a circle 212 around the base station. The remote terminal can be located anywhere along circle 212 if no additional information is available for the remote terminal.

Figure 2B:
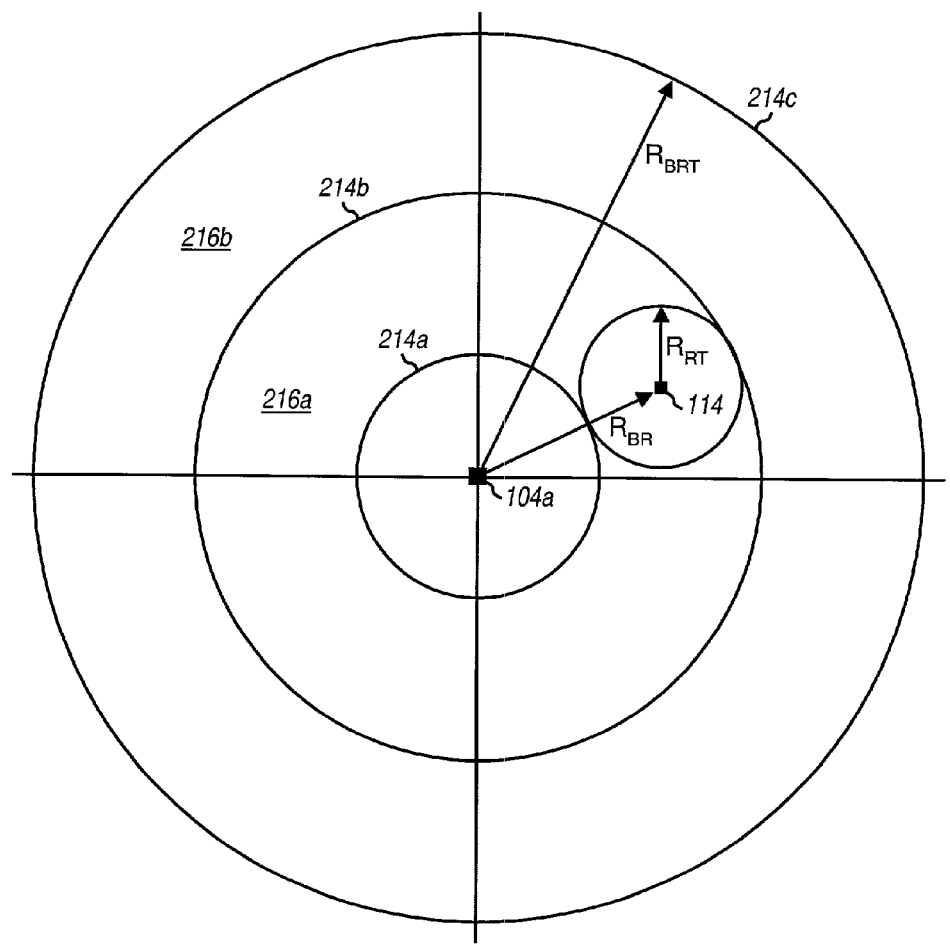

FIG. 2B is a diagram showing the possible positions of a remote terminal based on a time measurement for a cell that employs a repeater (also referred to herein as a "repeated cell"). In such a repeated cell, additional uncertainty in the position of the remote terminal is introduced by (1) the use of the repeater with the cell and (2) the additional delays associated with the repeater. The uncertainty due to each of these factors is described below.

To illustrate the uncertainty in the remote terminal's position due to the use of a repeater with a cell, an assumption can be made that no additional delays are introduced by the repeater. The signal arrival time measured at the remote terminal can be translated into a range $R_{BT}$. This range represents the range $R_{BR}$ from the base station to the repeater plus the range $R_{RT}$ from the repeater to the remote terminal (i.e., $R_{BT}=R_{BR}+R_{RT}$). The remote terminal may thus be located from ($R_{BR}-R_{RT}$) to ($R_{BR}+R_{RT}$) radially from the base station, which is represented by circles 214a and 214b, respectively. Again, if no additional information is available, the remote terminal may be located anywhere within an area 216a defined by circles 214a and 214b.

The additional delays introduced by the repeater increases the uncertainty of the remote terminal's position. The additional repeater delays can be translated into a range $R_R$, which is added to the range $R_{BT}$ to obtain the total range $R_{BRT}$ (i.e., the range corresponding to the signal arrival time from the base station to the remote terminal with the repeater delays). This total range $R_{BRT}$ is represented by a circle 214c in FIG. 2B. As shown in FIG. 2B, due to the uncertainty resulting from the use of the repeater with the cell and the additional delays introduced by the repeater (if the delays are not known), the remote terminal may be located anywhere within areas 216a and 216b based on the time measurement from the terminal.

The invention provides various techniques to detect whether a remote terminal is under the coverage of a repeater within a network so that the processing to estimate the remote terminal's position can account for the additional ambiguity typically associated with the repeater. In accordance with various aspects of the invention, a determination of whether the remote terminal is under the coverage of a repeater may be achieved based on (1) a list of base stations expected to be received while under the coverage of the repeater (i.e., a probable neighbor list) versus a list of base stations actually received by the remote terminal, (2) the characterized environment of the repeater, (3) the propagation delays for a transmission received at the remote terminal, (4) some other criteria, or (5) a combination thereof.

The invention further provides techniques to account and/or compensate for the additional ambiguity resulting from being under the coverage of a repeater. In one aspect, time measurements from repeated base stations may be discarded and not used to estimate the remote terminal's position. In another aspect, the processing to estimate the remote terminal's position may be adjusted to account for the additional ambiguity (e.g., a search window may be widened). In yet another aspect, multiple transmissions received from the same originating base station may be used to compute a series of position estimates for the remote terminal, and the most likely estimate is selected. For a CDMA network, an originating base station is one assigned to a specific PN offset. And in yet another aspect, multiple transmissions from multiple originating base stations may be used to compute a series of position estimates for the remote terminal, and again the most likely estimate is selected.

The techniques described herein may be used to more accurately to determine the position of the remote terminal by taking into account the sources for the time measurements and any additional information available for the base station and repeaters. Various aspects, embodiments, and features of the invention are described in further detail below.

Detection of Repeater Based on Probable Neighbor List

An aspect of the invention provides a technique to detect whether a remote terminal is under the coverage of a repeater based on probable neighbor lists formed for the repeaters in the network. In a typical wireless network, the coverage pattern is such that a remote terminal located anywhere within the network is likely to receive signals from a number of transmission sources (i.e., base stations and/or repeaters). This information can be cataloged and used to determine whether the remote terminal is under the coverage of a repeater.

Figure 3:
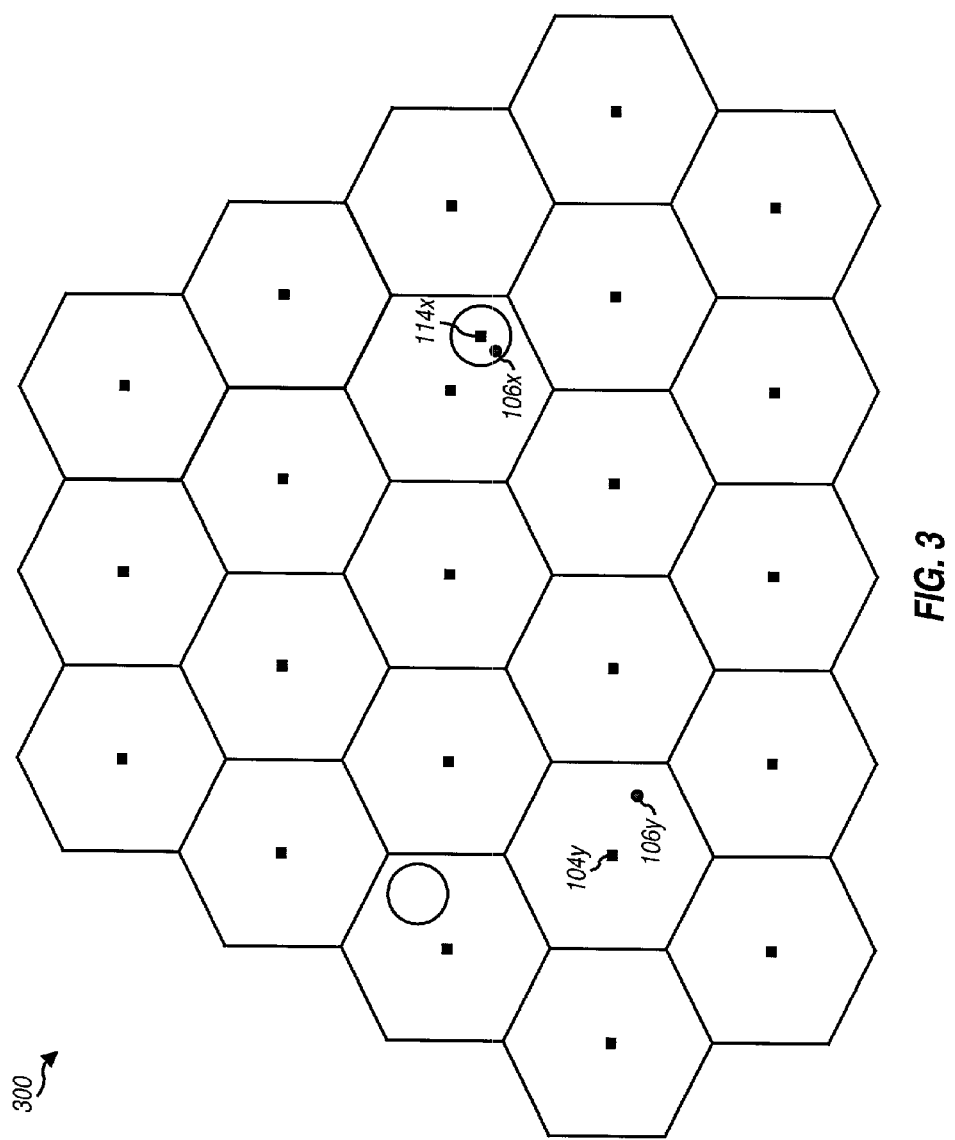
FIG. 3 is a diagram illustrating a network that includes a number of (hexagonal) cells, some of which include repeaters.

FIG. 3 is a diagram illustrating a network 300 that includes a number of (hexagonal) cells, some of which include repeaters. Depending on the particular location of a remote terminal within network 300, the remote terminal may detect signals (e.g., pilots) from a large number of base stations (e.g., up to 20 base stations). The base stations that may be received by the remote terminal are dependent on the particular location of the remote terminal within the network. For example, a remote terminal 106x under the coverage of a repeater 114x is likely to receive signals from a different set of base stations than a remote terminal 106y under the coverage of a base station 104y. In an embodiment, the possible base stations that may be received while under the coverage of a particular repeater are placed in a probable neighbor list for that repeater.

As noted above, a repeater is typically employed to solve coverage problem. For example, a repeater may be employed to cover a region (hole) in the network that may be "shadowed" out. Such regions may include, for example, mountains, tunnels, shopping malls, and so on. A repeater may also be used to extend coverage to a new area that cannot be reached by an existing base station. Thus, the probable neighbor list for each repeater is likely to be different from those of other repeaters in the network and would be a subset of the base stations surrounding the base station that is repeated.

In an embodiment, the base stations and repeaters within the network are characterized. This characterization may entail determining the layout of the network, the locations of each base station and repeater within the network, and so on. Additionally, measurements may be made by remote terminals at various locations within the entire network to collect information as to which base stations may be detected in that coverage area. This information can be used to generate a probable neighbor list for the repeater. The process can be performed for each repeater within the network.

The information for a repeater can be collected by measurements made when the repeater is initially deployed. Alternatively, this information can be "learned" from the remote terminal, when operated under the coverage of the repeater, during normal operation. The PDE can generate and maintain the probable neighbor lists for all repeaters located within the network.

Thereafter, if the PDE suspects that a particular remote terminal is under the coverage of a repeater, it can verify this by comparing the sources of the time measurements received from the remote terminal against the probable neighbor lists maintained for the repeaters. The PDE may assign a particular degree of confidence in its assessment of whether the remote terminal is under a particular repeater's coverage.

Figure 4:
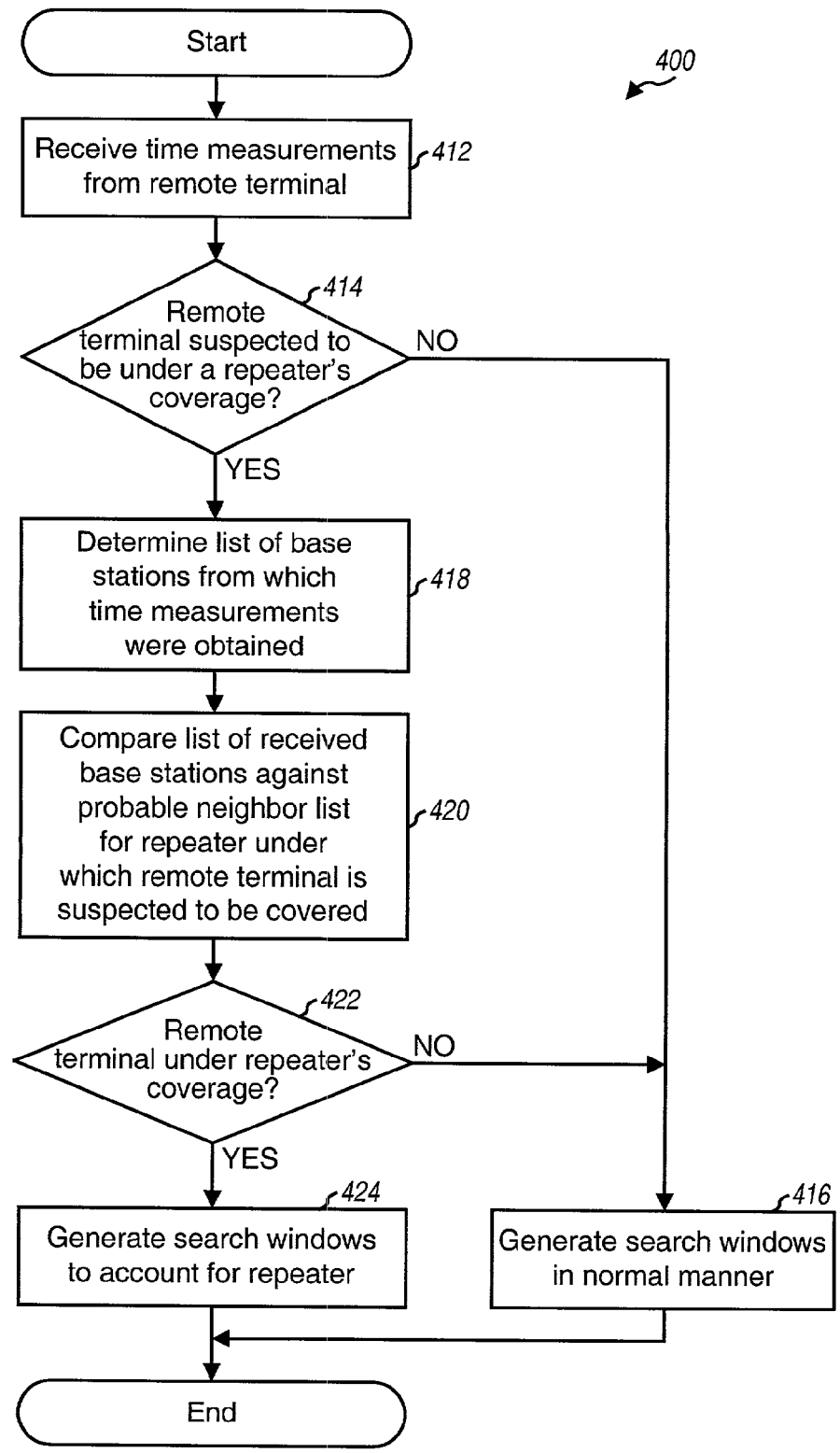
FIG. 4 is a flow diagram of an embodiment of a process for determining whether or not a remote terminal is under the coverage of a repeater by using the repeater's probable neighbor list.

FIG. 4 is a flow diagram of an embodiment of a process 400 for determining whether a remote terminal is under the coverage of a repeater by using the repeater's probable neighbor list. Initially, the PDE receives time measurements from the remote terminal, at step 412. Based on any one of a number of techniques (some of which are described below), the PDE may suspect that the remote terminal is under the coverage of a repeater, at step 414. This suspicion may be derived, for example, based on the received time measurements (e.g., if excessive delays are detected in any one of the time measurements). If the remote terminal is not suspected to be under a repeater's coverage, the search windows for the remote terminal are generated in the normal manner (i.e., without compensating for repeaters), at step 416.

Otherwise, if the remote terminal is suspected to be under a repeater's coverage, the list of base stations from which the time measurements were obtained is determined, at step 418. This list of received base stations may also be generated by the PDE at step 412 for the time measurements received from the remote terminal. The list of received base stations is then compared against the probable neighbor list for the repeater under which the remote terminal is suspected to be covered, at step 420.

Based on the result of the comparison in step 420, a determination is made whether the remote terminal is under the repeater's coverage, at step 422. If the answer is no, the search windows for the remote terminal are generated in the normal manner, at step 416. Otherwise, if the remote terminal is deemed to be under the repeater's coverage, the search windows are generated in a manner to account for the additional ambiguity resulting from being under the repeater's coverage, at step 424. For example, the search windows may be widened and/or shifted depending on the detected delays. The process then terminates.

Detection of Repeater Based on Environmental Information

An aspect of the invention provides a technique to detect whether a remote terminal is under the coverage of a repeater based on environmental information collected for repeaters within the network. In an embodiment, the PDE "catalogs" the environment types for some or all repeaters in the network, with the environment types being descriptive of the repeater's coverage. This cataloged information is thereafter used to determine whether a remote terminal is under the coverage of a repeater.

Figure 5:
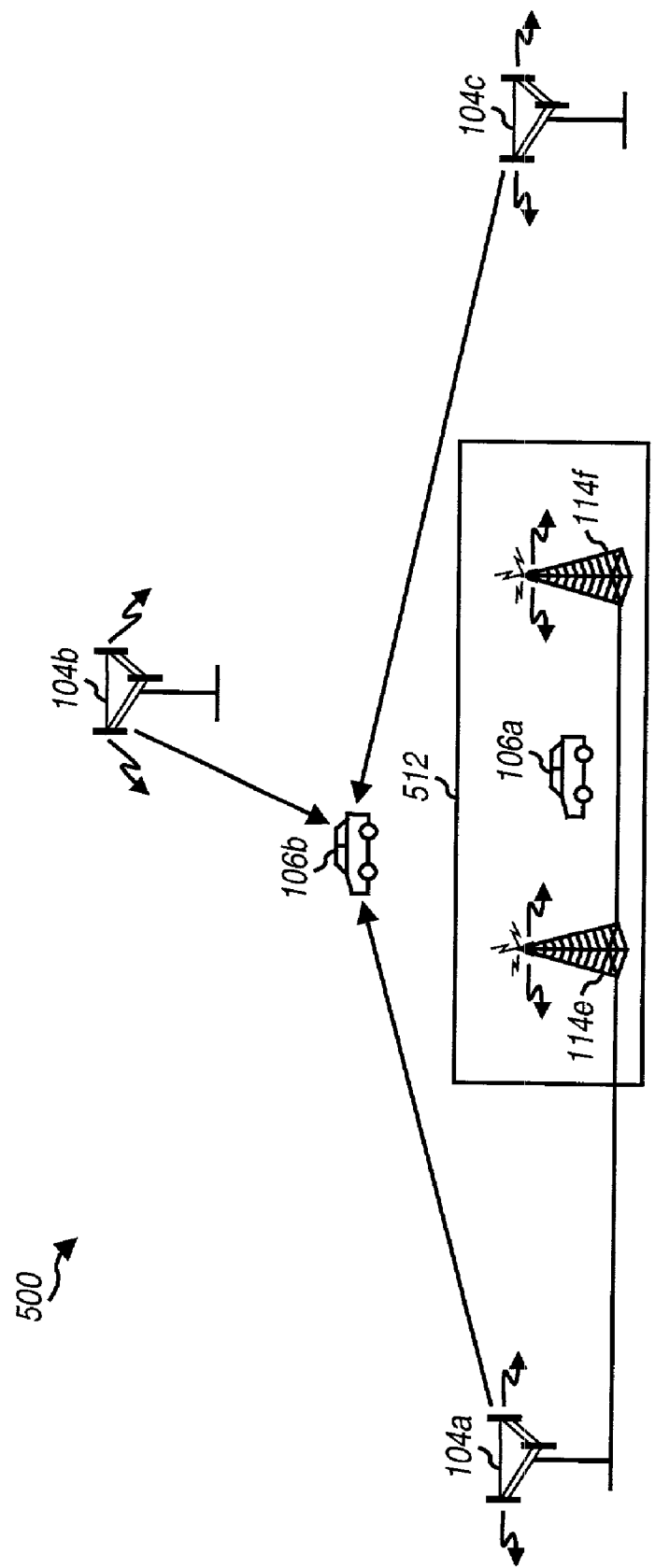
FIG. 5 is a diagram illustrating an example network in which the cataloged environment types of the repeaters may be used to determine whether a remote terminal is under the coverage of a repeater.

FIG. 5 is a diagram illustrating an example network 500 in which the cataloged environment types of the repeaters may be used to determine whether a remote terminal is under the coverage of a repeater. In this example, three base stations 104a through 104c provide coverage for a portion of the network. Base station 104a is coupled to two repeaters 114e and 114f used to provide coverage for a tunnel 512. Because of obstruction, remote terminal 106a within a portion of the tunnel is only able to receive the signal from base station 104a (via repeater 114e and/or 114f) while the signals from base station 104b and (to a large extent) base station 104c cannot be received by the terminal. Another terminal 106b located outside, and not obstructed by, the tunnel is able to receive the signals from all three base stations, as shown in FIG. 5.

In an embodiment, the PDE can note the environment types for the repeaters. In the example shown in FIG. 5, the PDE can note that repeaters 114e and 114f are located within a tunnel and that the obstruction caused by the tunnel would likely block the signals from other base stations. Thus, if the PDE receives only one time measurement from a remote terminal (e.g., remote terminal 106a) determined to be located in the area between base stations 104a, 104b, and 104c, the PDE can deduce that the time measurement is from a repeater (e.g., repeater 114e or 114f). Correspondingly, if the PDE receives a number of time measurements for a number of base stations from a remote terminal (e.g., remote terminal 106b) determined to be located near the same area, the PDE can deduce that the remote terminal is not under the coverage of repeater 114e or 114f. Thus, the cataloged environment type of the repeater's coverage can be used to determine whether or not the remote terminal is under the coverage of a repeater.

In an embodiment, the environment type of a repeater may be cataloged by the type of fading and path loss encountered in the repeater. For example, signals in an urban area generally do not degrade in the same way as they do in a rural or suburban area. Such information may be used to determine which repeater solution to proceed. As an example, in a tunnel, the base station signals will be very weak and the GPS signals are almost undetectable. So if it is concluded from the remote terminal's readings that it is located in a tunnel, then that provides some information as to the remote terminal's position. Also if the particular tunnel is repeated, then proper adjustments can be made on the measurements to determine the position of the remote terminal.

In a rural area, the signals have relatively better path loss (i.e., they do not degrade as much with distance). If it is known how a signal degrades in whatever medium it propagates, the path distance traveled by the signal may be determined. If that distance is deemed much greater than the separation of the remote terminal and base station, the difference can be due to repeaters and accounted for when calculating position.

In an embodiment, the environment type of a repeater is defined with the use of a neighbor list for each repeater. For the example shown in FIG. 5, a terminal under the coverage of repeater 114e is likely to be able to receive only the signal from base station 104a and unlikely to receive the signals from base stations 104b and 104c. Thus, the neighbor list for repeater 114e is empty. However, a terminal under the coverage of repeater 114f may also receive the signal from base station 104c, and the neighbor list for repeater 114f accordingly reflects this (e.g., as shown in Table 1). The neighbor list for base stations 104a may include base stations 104b and 104c, the neighbor list for base station 104b may include base stations 104a and 104c, and the neighbor list for base station 104c may include base stations 104a and 104b.

Table 1 lists the transmission sources for the example shown in FIG. 5 and their neighbor lists.

TABLE 1

| Transmission Source | Repeater Employed | Neighbor List |
| --- | --- | --- |
| Base station 104a | Yes | Base stations 104b and 104c |
| Repeater 114e | — | Empty |
| Repeater 114f | — | Base station 104c |
| Base station 104b | No | Base stations 104a and 104c |
| Base station 104c | No | Base stations 104a and 104b |

FIG. 5 shows a specific example of the cataloging of the environment type to determine the transmission source of a time measurement. Other examples can be provided for other environments, for example, downtown, rural areas, shopping malls, indoors, and so on. For example, referring back to FIG. 1, a remote terminal under the coverage of either repeater 114b or 114c may not receive signals from as many other base stations as a remote terminal located under the coverage of base station 104a, 104b, or 104c.

Detection of Repeater Based on Time of Arrival (TOA) or Round Trip Delay (RTD)

An aspect of the invention provides a technique to detect whether a remote terminal is under the coverage of a repeater based on the time measurements from the remote terminal. This technique exploits known or estimated delays associated with a transmission from a repeater to a remote terminal and known or estimated delays typically associated with the repeater itself to determine whether or not the remote terminal is under the coverage of the repeater. This technique may be used for various network configurations, and is especially applicable for a network configuration in which repeaters are used to extend the coverage of the network, such as repeaters 114b and 114c in FIG. 1.

In an embodiment, the timing of the system may be calibrated. For a base station, the time difference between system time and the timing of the base station's transmission may be determined. And for a repeater, the measured delay between the receive and transmit paths of the repeaters may also be determined. These time measurements may be used to detect whether or not the remote terminal is under a repeater's coverage, as described in further detail below.

Figure 6A:
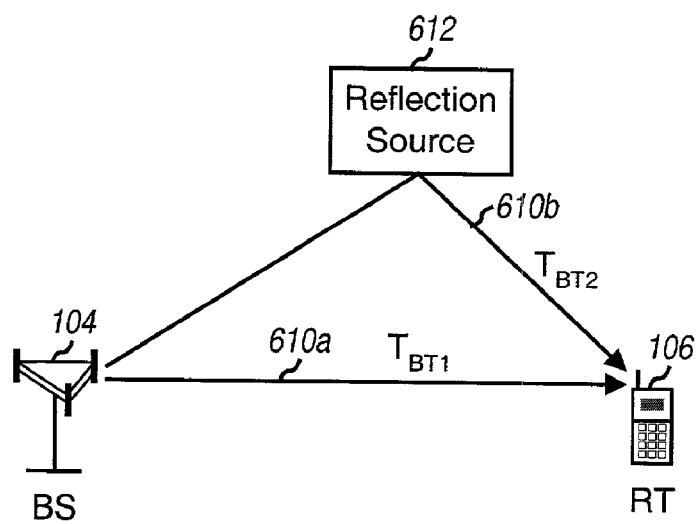
FIGS. 6A and 6B are diagrams of transmissions from a base station to a remote terminal directly and via a repeater, respectively.

FIG. 6A is a diagram of a transmission from a base station 104 to a remote terminal 106 whereby no repeaters are employed. As shown in FIG. 6A, the signal from base station 104 can reach remote terminal 106, via a direct line of sight path 610a, or a reflected path 610b after bouncing from a reflection source 612. Each transmission path is associated with a corresponding propagation delay (e.g., $T_{BT1}$ and $T_{BT2}$, as shown in FIG. 6A).

Figure 6B:
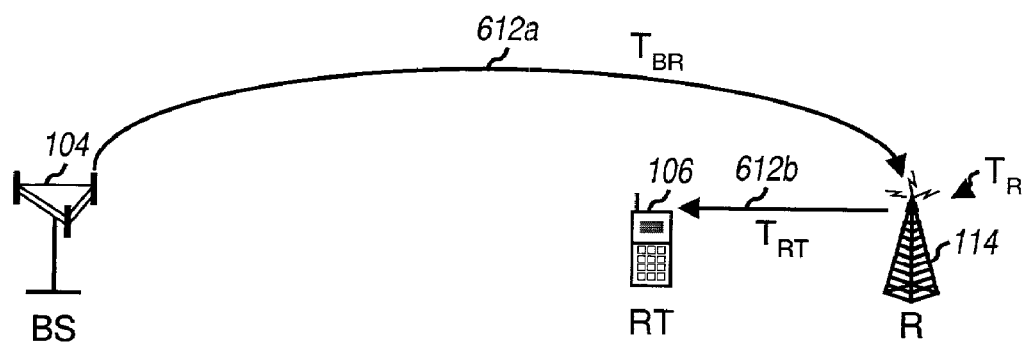

FIG. 6B is a diagram of a transmission from base station 104 to remote terminal 106 via repeater 114. In this example, remote terminal 106 is under the coverage of repeater 114 and, because of an obstruction or some other reason, is not able to receive a direct transmission from base station 104 (the received transmission from base station 104 may be weak). As shown in FIG. 6B, the signal is first transmitted from base station 104 to repeater 114 via a wireless or wireline link 612a, conditioned by repeater 114, and transmitted to remote terminal 106. The additional delays $T_R$ introduced by the circuits within repeater 114 increases the overall propagation delays of the signal. Moreover, if the repeater is located further away from the base station than the remote terminal (as shown in FIG. 6B), the signal experiences longer propagation delays because of the longer distance to the repeater and then back to the remote terminal, as illustrated in FIG. 6B.

For FIG. 6A, the worst case propagation delays for the transmission from base station 104 to remote terminal 106 can be determined as the delays $T_{BT2}$ associated with reflected path 610b. And for FIG. 6B, the best-case propagation delays $T_{BRT}$ for the transmission from base station 104 to remote terminal 106 is dependent on the delays $T_{BR}$ from the base station to the repeater, the delays $T_R$ introduced by the repeater, and the delays $T_{RT}$ from the repeater to the remote terminal (i.e., $T_{BRT}=T_{BR}+T_R+T_{RT}$). If there is a time difference (i.e., a gap) between the worst case propagation delays $T_{BT2}$ for a transmission from the base station and the best case propagation delays $T_{BRT}$ for a transmission from the repeater, then a threshold value can be selected to determine whether the remote terminal is under the coverage of the base station or the repeater. The threshold value can be selected based on the following:

$$T_{Base\_station} < T_{TH} < T_{Repeater}, \qquad \text{Eq(1)}$$

where $T_{Base\_station}$ is the worst case propagation delays for a transmission received from the base station ($T_{BT2}$), $T_{TH}$ is the threshold value, and $T_{Repeater}$ is the best-case propagation delays for a transmission received from the repeater ($T_{BRT}$).

Once the threshold value for a repeated base station is selected, the PDE can thereafter compare a time measurement received from the remote terminal for that repeated base station to the threshold value. If the propagation delays indicated by the time measurement is greater than the threshold value, the PDE can deem that the time measurement is for the repeater. Otherwise, if the propagation delays indicated by the time measurement is less than the threshold value, the PDE can deem that the time measurement is for the base station.

Equation (1) assumes that the worst-case propagation delays for the base station is less than the best-case propagation delays for the repeater (i.e., $T_{Base\_Station} < T_{Repeater}$). However, even if there is an overlap between these propagation delays (i.e., $T_{Base\_station} > T_{Repeater}$), a threshold value can be selected within the range of the overlap to achieve a high likelihood of correctly detecting whether the remote terminal is under the coverage of the base station or the repeater.

Figure 7:
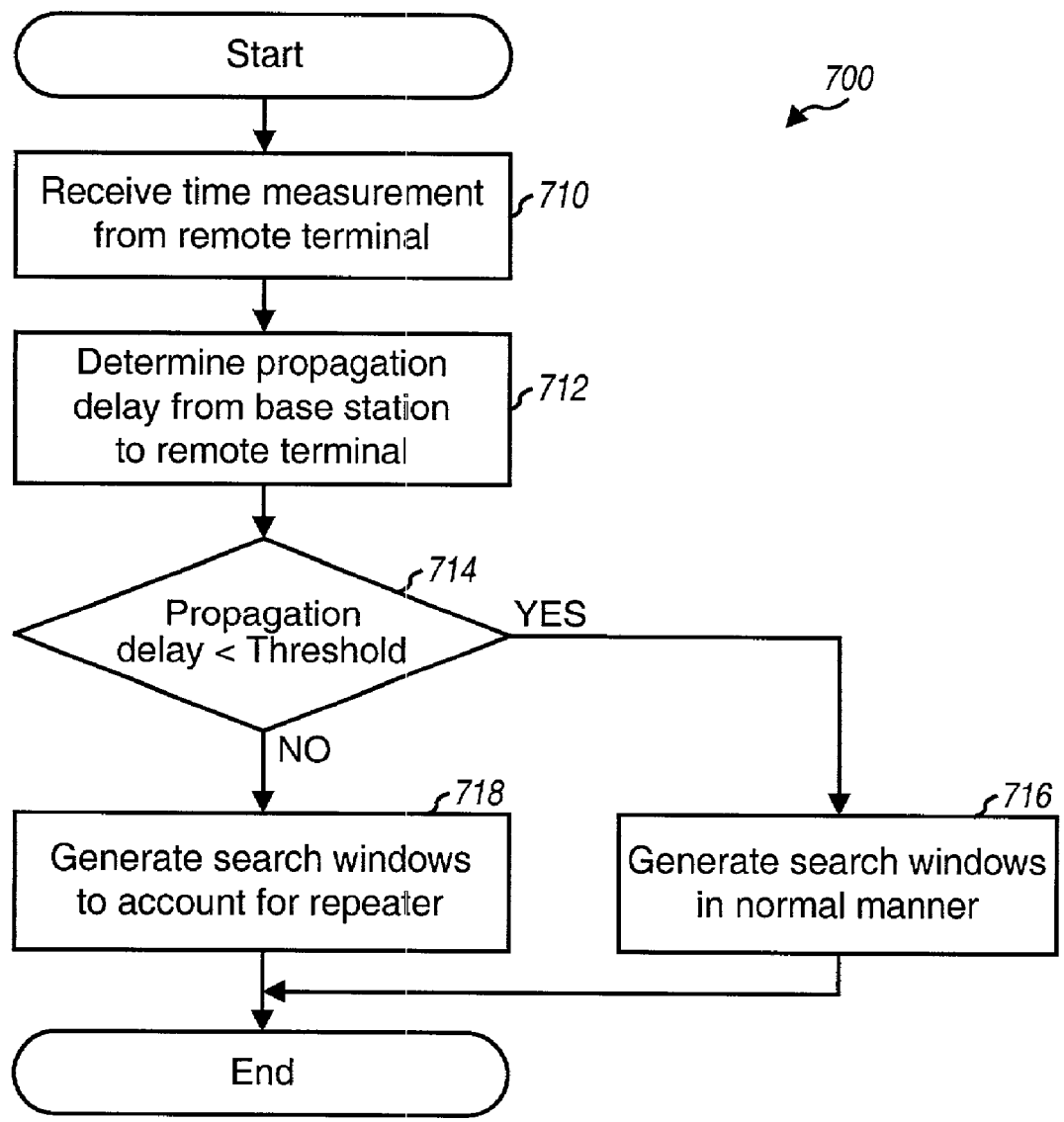
FIG. 7 is a flow diagram of an embodiment of a process to determine whether a remote terminal is under the coverage of a base station or a repeater based on propagation delays.

FIG. 7 is a flow diagram of an embodiment of a process 700 to determine whether a remote terminal is under the coverage of a base station or a repeater based on propagation delays. Initially, the PDE receives a time measurement from the remote terminal, at step 710. The PDE then determines the propagation delays (i.e., the one-way delay) of the transmission from the originating base station to the remote terminal based on the received time measurement, at step 712. Alternatively, the PDE may determine a round trip delays (RTD) estimate of a transmission from the base station to the remote terminal and then back to the base station. This RTD estimate would be approximately twice the one-way delays from the base station to the remote terminal. The one-way delays estimate is indicative of the transmission delays from the base station (possibly through one or more repeaters) to the remote terminal.

At step 714, a determination is made whether the one-way delays (or RTD) estimate is less than a threshold value that has been selected for the base station based on the factors described above. If the one-way delays estimate is less than the threshold value, the remote terminal is deemed to be under the coverage of the base station and position determination for the remote terminal is performed without considering the additional ambiguity associated with repeaters. Thus, the search windows for the remote terminal can be generated in the normal manner, at step 716. Otherwise, if the one-way delays estimate is greater than or equal to the threshold value, the remote terminal is deemed to be under the coverage of the repeater and position determination for the remote terminal is performed taking into account the additional ambiguity associated with the repeater. In this case, the search windows for the remote terminal can be generated to account for the repeater, at step 718. The process then terminates.

Position Determination Based on Selective Measurements

In accordance with an aspect of the invention, position determination for a remote terminal is performed based on selected ones of the time measurements received from a remote terminal. As described above with respect to FIGS. 2A and 2B, the mere use of a repeater and also the additional delays associated with the repeater result in additional ambiguity in the position of the remote terminal. Because of this additional uncertainty, the time measurement for a cell employing a repeater may not be helpful in determining the position of the remote terminal. Thus, in accordance with this aspect of the invention, a time measurement for a repeated base station is not used to determine the position of the remote terminal.

Referring back to FIG. 1, remote terminal 106 is located within coverage area 112a of repeater 114a and may receive a transmission from base station 104a or repeater 114a, or both, depending on various factors such as the communication link, fading conditions, and so on. Thus, there may be uncertainty as to the actual source of the transmission received by remote terminal 106 for cell 1, which may be either base station 104a or repeater 114a. Since the source of the transmission is unclear, there may be greater uncertainty in the estimated position of a remote terminal located in a cell that employs a repeater, as described in further detail below.

The estimated position of a remote terminal may be less accurate if a time measurement for a repeated base station is erroneously equated to a wrong source than if that time measurement was not used at all for position determination. As an example, if the time measurement received for repeater 114a is erroneously equated as being for base station 104a, then remote terminal 106 may be erroneously estimated as being further from the base station than in actuality. The amount of error is related to the amount of additional delays introduced by the repeater. Alternatively, if the time measurement received for base station 104a is erroneously equated as being for repeater 114a, then remote terminal 106 will be erroneously estimated as being closer to the base station than in actuality.

In an embodiment, the PDE maintains a list of base stations for which it may receive time measurements and, for each base station in the list, an indication of whether repeaters are employed with the base station. Table 2 is an example of a list maintained by the PDE for the network layout shown in FIG. 1.

TABLE 2

| Cells | Repeater Employed |
|---|---|
| Base station 104a | Yes |
| Base station 104b | Yes |
| Base station 104c | No |

For each time measurement reported by the remote terminal, the PDE determines the base station for which the time measurement is associated (i.e., the base station originating the transmission from which the time measurement was derived). The PDE then consults the table to determine whether the time measurement is associated with a base station that employs a repeater (i.e., a repeated base station). If the table indicates that the originating base station is a repeated base station, the PDE can elect to omit this time measurement from being considered in the position determination processing. In this case, the PDE would estimate the position of the remote terminal and/or compute the search windows for the remote terminal based on time measurements for base station not associated with repeaters (i.e., non-repeated base stations).

Alternatively, the PDE can elect to consider this time measurement associated with a repeated base station in the position determination processing. The PDE would then determine the position of the remote terminal and/or compute the search windows for the remote terminal taking into account the ambiguity introduced by the repeaters.

Figure 8A:
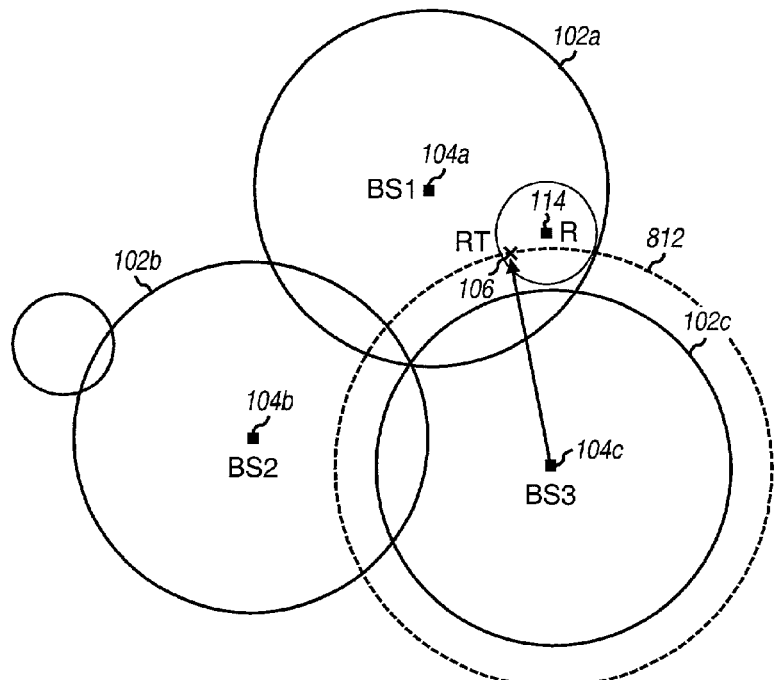
FIGS. 8A and 8B are diagrams illustrating the estimated positions for a remote terminal with time measurements for a repeated base station discarded and considered, respectively.

FIG. 8A is a diagram illustrating the estimated position for a remote terminal with the time measurements for repeated base stations discarded. FIG. 8A corresponds generally to the example network shown in FIG. 1. Initially, remote terminal 106 receives transmissions originating from base stations 104a, 104b, and 104c, and reports the time measurements to PDE 130. PDE 130 consults a table and recognizes that base stations 104a and 104b employ repeaters and that base station 104c does not employ a repeater. Thus, PDE 130 may discard the time measurements for base stations 104a and 104b, and only considers the time measurement for base station 104c. The estimated position for remote terminal 106 would then be a dotted circle 812 having a radius defined by the propagation delays between base station 104c and remote terminal 106. The search windows for the GPS satellites are then generated by PDE 130 based on this initial position estimate.

Figure 8B:
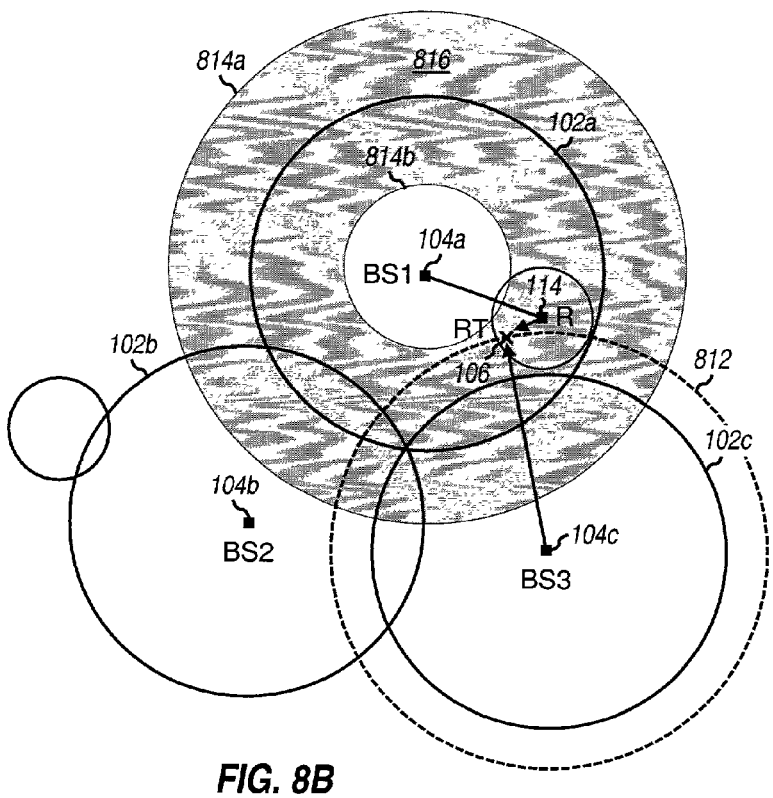

FIG. 8B is a diagram illustrating the estimated position for remote terminal 106 with the time measurement for a repeated base station considered. Again, FIG. 8B corresponds generally to the example network shown in FIG. 1. However, the time measurement for base stations 104a is also used to estimate the position of remote terminal 106. In this case, the remote terminal's position would be the intersection of a shaded area 816 associated with base station 104a and dotted circle 812 associated with base station 104c. Again, the search windows for the GPS satellites are generated by PDE 130 based on the initial estimated position of the remote terminal.

As described above in FIG. 2B, shaded area 816 results from the uncertainty associated with the deployment of repeater 114. Depending on the additional delays introduced by repeater 114, shaded area 816 may be much larger than that shown in FIG. 8B, and may encompass the entire coverage area of base station 104c. In that case, the use of the time measurement for base station 104a may result in more uncertainty than simply omitting this time measurement.

Figure 9:
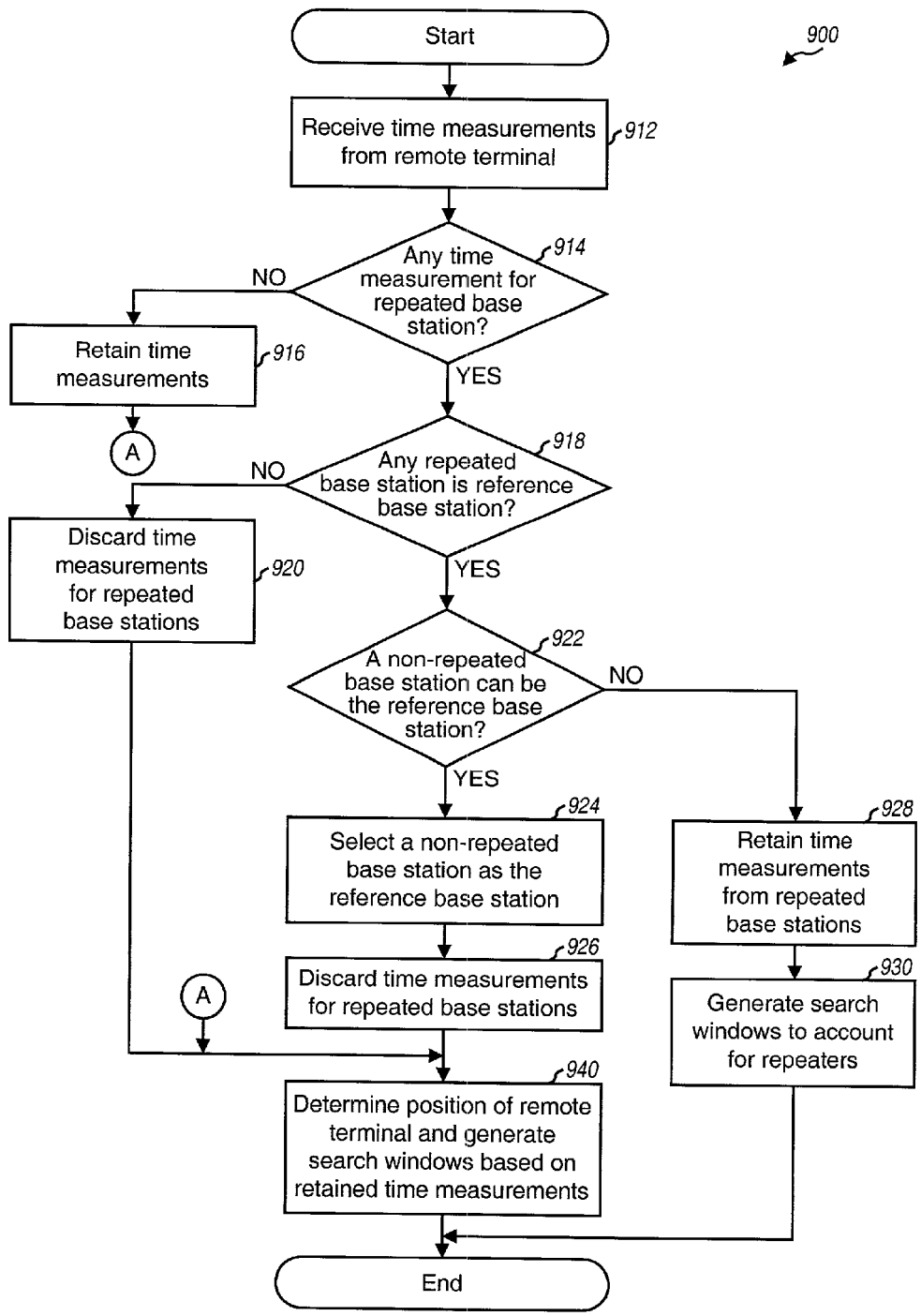
FIG. 9 is a flow diagram of an embodiment of a process for estimating position based on selective time measurements received from a remote terminal.

FIG. 9 is a flow diagram of an embodiment of a process 900 for estimating position of a remote terminal based on selective time measurements received from the terminal. Initially, the PDE receives the time measurements from the remote terminal, at step 912. The PDE then determines whether any of the received time measurements is for a base station that is repeated, at step 914. This determination can be achieved by identifying the base station associate with each time measurement and consulting a table (such as Table 2) to determine whether the base station is associated with a repeater. If none of the time measurements are for a repeated base station, the PDE retains all received time measurements, at step 916, and proceeds to step 940.

At step 914, if any received time measurement is for a repeated base station, a determination is made whether or not any of the repeated base stations is the reference base station, at step 918. If none of the repeated base stations is the reference base station, the time measurements for the repeated base stations are discarded, at step 920. The process then proceeds to step 940.

The reference base station is the base station from which the remote terminal derives its timing. Position is computed by determining the difference in the arrival times of signals from other base stations (i.e., the difference in time between the arriving paths from the reference base station and other base stations). For positioning determination purposes, any reasonably strong received base station may be the reference base station.

At step 918, if the reference base station is determined to be a repeated base station, a determination is made whether a non-repeated base station can be selected as the reference base station, at step 922. If the answer is yes, a non-repeated base station is selected as the reference base station, at step 924, and the time measurements for repeated base stations are discarded, at step 926. The PDE then determines an initial position estimate for the remote terminal and further generates search windows for the GPS satellites based on the retained time measurements, at step 940.

Back at step 922, if the time measurements are from repeated base stations and a non-repeated base station cannot be selected as the reference base station, the time measurements from the repeated base stations are retained, at step 928. The PDE then appropriately generates search windows to account for the additional ambiguity due to the repeaters, at step 930.

Generation of Search Windows to Account for Detected Presence of Repeaters

As noted above, the mere presence of repeaters in a network results in additional ambiguity in the estimated position of a remote terminal because it may not be known with certainty whether a transmission is received from a base station or its repeater. Moreover, additional delays introduced by the repeaters also results in additional ambiguity in the remote terminal's estimated position. For a base station that is not associated with a repeater, a remote terminal can be estimated as being located on a circle that surrounds the base station, with the radius of the circle being dependent on the propagation delays estimate from the base station, as shown in FIG. 2A. And for a base station that is associated with a repeater, the remote terminal can be estimated as being located on a circular region that surrounds the base station, with the size of the region being dependent on the coverage area of the repeater as well as the additional delays introduced by the repeater, as shown in FIG. 2B. The generation of a search window for a GPS satellite to account for the additional uncertainty in the estimated position of a remote terminal due to the use of repeater is described below.

Figure 10A:
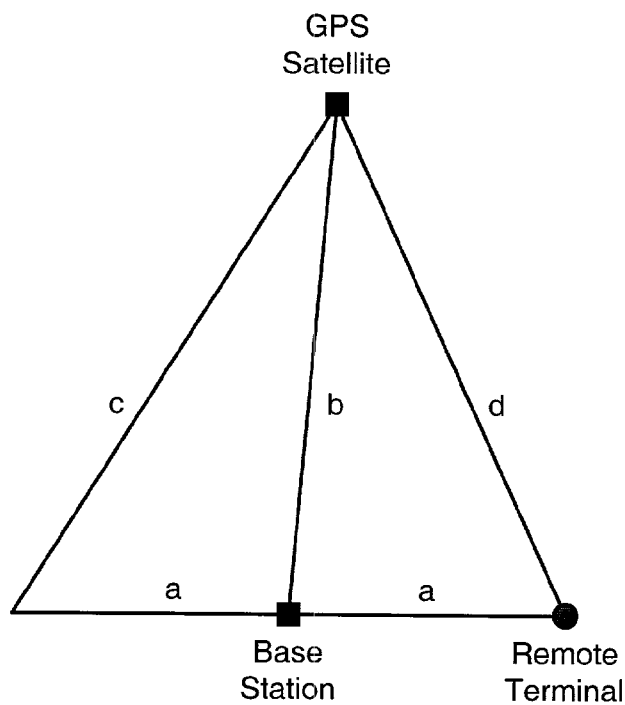
FIGS. 10A and 10B are two-dimensional (2-D) diagrams illustrating the determination of a search window for a GPS satellite based on a time measurement received for a base station and a repeated base station, respectively.

FIG. 10A is a two-dimensional (2-D) diagram illustrating the determination of a search window for a GPS satellite based on a time measurement received for a base station that does not employ a repeater. The time measurement is indicative of the propagation delays between the base station and the remote terminal and can be translated into a spatial range a, as shown in FIG. 10A. If no additional information is provided for the position of the remote terminal (e.g., no other time measurements are received for other base stations) then, in the worst case, the remote terminal may be located on either side of the base station by the distance a. The distance b between the GPS satellite and the base station can be determined in a manner known in the art.

Using trigonometric calculations, the distance between the remote terminal and the GPS satellite can be computed as either c or d, depending on whether the remote terminal is located on the left or right side of the base station, respectively. The search window for this GPS satellite can be computed as a time window that is related to the difference between the distances c and d (i.e., search window $\propto$ (c−d)). The time offset to the center of the search window is related to the distance b (i.e., time offset $\propto$ b). The remote terminal may be instructed to search for and acquire the transmission from the GPS satellite based on the search window at the determined time offset.

Figure 10B:
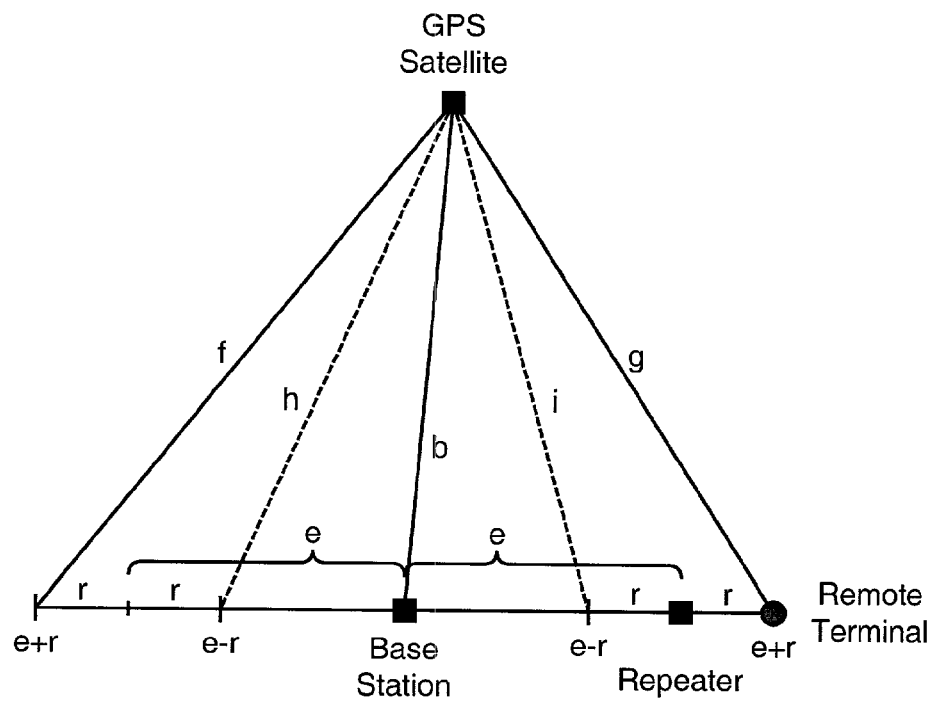

FIG. 10B is a two-dimensional (2-D) diagram illustrating the determination of a search window for a remote terminal based on a time measurement received for a base station that employs a repeater. For this simple example, the repeater is assumed to introduce no additional delays. As shown in FIG. 10B, the propagation delays between the base station and the repeater is translated into a spatial range e, and the propagation time between the repeater and the remote terminal is translated into a range r. If no additional information is provided for the location of the remote terminal, then in the worst case the remote terminal may be assumed to be located on either side of the base station within a range defined by the distances (e−r) and (e+r). The distance b between the GPS satellite and the base station can be determined in the manner known in the art.

Using trigonometric calculations, the distance between the remote terminal and the GPS satellite can be computed as either f or g, depending on which side of the base station the remote terminal is located and assuming the remote terminal is located at the distance (e+r) from the base station. Similarly, the distance between the remote terminal and the GPS satellite is determined as either h or i, again depending on which side of the base station the remote terminal is located and assuming the remote terminal is located at the distance (e−r) from the base station. The worst-case difference between these distances is (f−i), and the search window can be computed to be proportional to this worst case difference (i.e., search window $\propto$ (f−i)).

As indicated in FIG. 2B, the additional delays introduced by a repeater further increase the ambiguity in the position of the remote terminal. This additional ambiguity can be accounted for by increasing the search window for the GPS satellite by an amount related to the additional delays introduced by the repeater.

Figure 11:
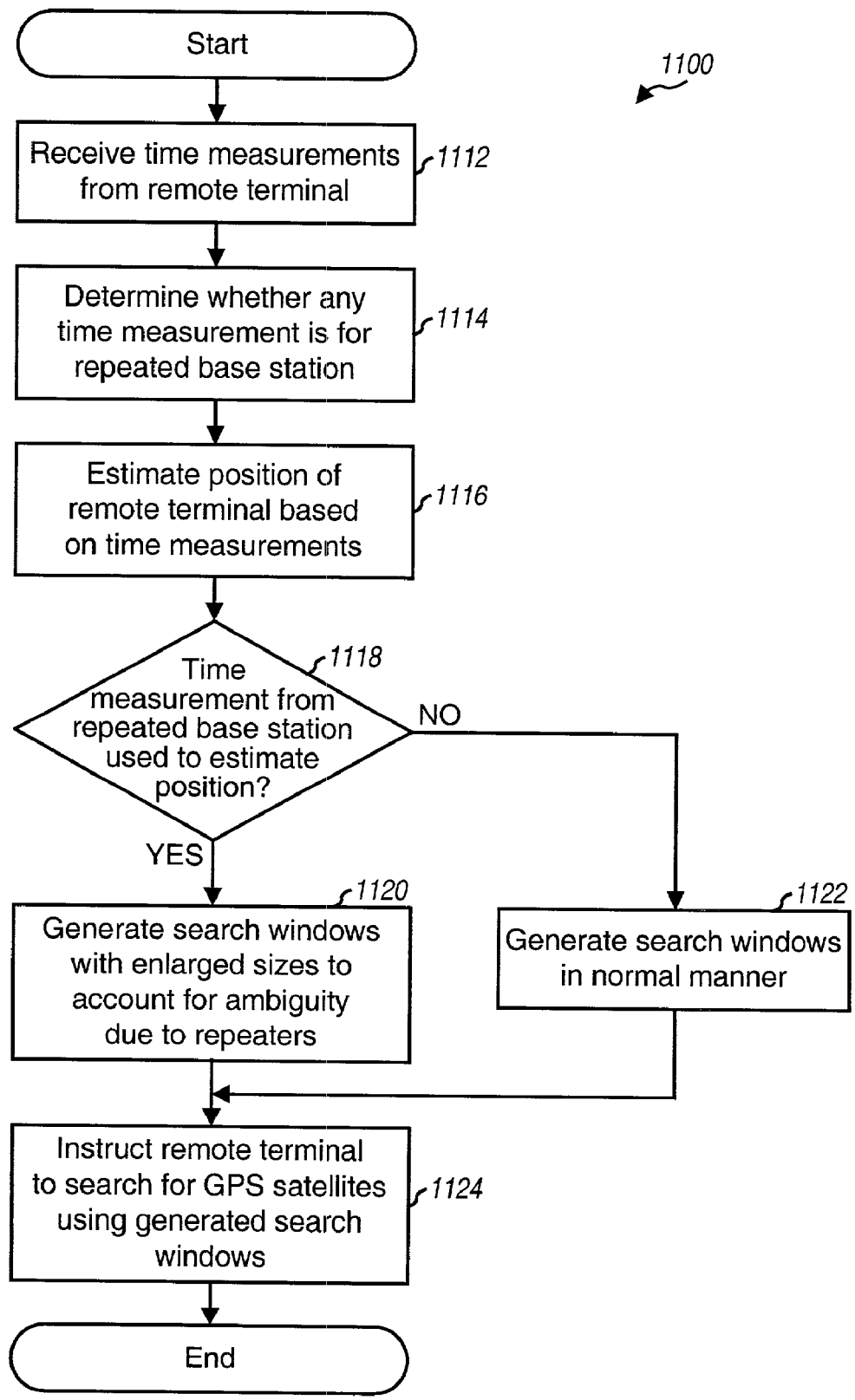
FIG. 11 is a flow diagram of an embodiment of a process for determining the position of a remote terminal that takes into account transmissions received from repeaters.

FIG. 11 is a flow diagram of an embodiment of a process 1100 for determining the position of a remote terminal that takes into account transmissions received from repeaters. Initially, the PDE receives time measurements from a remote terminal, at step 1112. The PDE can then determine whether or not any of the received time measurements is for a repeated base station, at step 1114. The detection for repeaters can be achieved using any combination of the techniques described above. At step 1116, the PDE estimates the position of the remote terminal based on the received time measurements. The time measurements for repeated base stations may or may not be considered in estimating the remote terminal's position, as described above.

If one or more time measurements for repeated base stations are used to estimate the remote terminal's position, at step 1118, the PDE generates search windows for GPS satellites having enlarged sizes to account for the additional ambiguity in the estimated position due to repeaters, at step 1120. The search windows can be generated based on the technique described above. Otherwise, if none of the time measurements used to estimate the remote terminal's position are from a repeated base station, the search windows are generated in the normal manner, at step 1122. The PDE then instructs the remote terminal to search for GPS satellites using the generated search windows, at step 1124.

Position Determination Using Multiple Time Measurements

In a typical cellular environment, a remote terminal receives multiple signals from a number of transmitting sources (i.e., base stations and/or repeaters). For a CDMA system, these transmissions may be received and individually processed.

In accordance with an aspect of the invention, the position of the remote terminal is estimated based on a number of transmissions received at the terminal from a particular originating base stations. Each transmission is received at a particular signal level and associated with a particular propagation delays. The remote terminal can process the transmissions received from the base stations and repeaters and report some or all received transmissions (e.g., report transmissions having signal strengths above a particular threshold). The PDE can then use the time measurements for these reported transmissions to estimate the position of the remote terminal. The PDE may select and utilize the time measurements that result in the position estimate having the best confidence. If the PDE determines that the remote terminal is under the coverage of a repeater in the network, then the PDE may instruct the remote terminal to widen or shift the search windows.

Figure 12A:
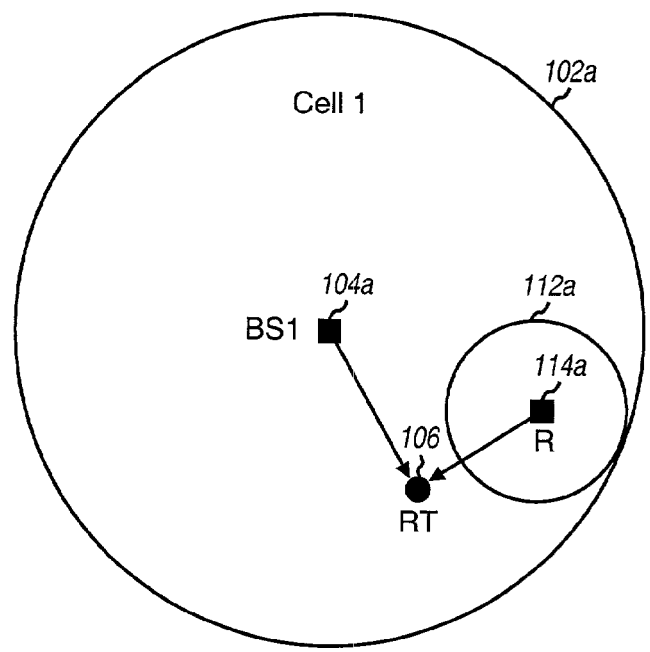
FIGS. 12A and 12B are diagrams showing multiple transmissions received from a base station and a repeater when a remote terminal is under the coverage of the base station and the repeater, respectively.

FIG. 12A is a diagram showing multiple transmissions received by a remote terminal from a base station and a repeater when the remote terminal is under the coverage of the base station. In the example shown in FIG. 12A, remote terminal 106 receives a first transmission from base station 104a having propagation delays of $T_{BT1}$ and further receives a second transmission from repeater 114a having propagation delays of $T_{RT1}$. The time measurements for the received transmissions are reported to the PDE, which can then determine the position of the remote terminal based on the reported time measurements.

For the example shown in FIG. 12A, since remote terminal 106 is not under the coverage of repeater 114a, the signal strength for the transmission received from the repeater is likely to be weak. And since remote terminal 106 is under the coverage of base station 104a, the signal strength for the transmission received from the base station is likely to be stronger. A series of position fixes (i.e., position estimates) may be generated by the PDE for the remote terminal based on the received time measurements. The position fix having the best metric can be selected as the estimated position of the remote terminal.

Determination of the position of a remote terminal based on a number of time measurements for a number of transmissions from the same originating base station can be achieved, for example, in a manner described in U.S. Pat. No. 6,289, 280, issued on Sep. 11, 2001 entitled "METHOD AND APPARATUS FOR DETERMINING AN ALGEBRAIC SOLUTION TO GPS TERRESTRIAL HYBRID LOCATION SYSTEM EQUATIONS," assigned to the assignee of the present application and incorporated herein by reference. A root mean square error (RMSE) metric can be computed in a manner known in the art for each position fix based on the signal strength associated with each time of arrival (TOA) estimate. Weaker signal strength for a received multipath corresponds to a higher likelihood that the signal has been bounced around. A transmission with weaker signal strength generally corresponds to greater ambiguity in a position fix computed based on this transmission and a correspondingly lower metric. Thus, the position fixes are usually associated with "residuals", which are representative of the uncertainty for the estimated position fixes. The computation of the metric is described in further detail in the aforementioned U.S. Pat. No. 6,289,280.

Figure 12B:
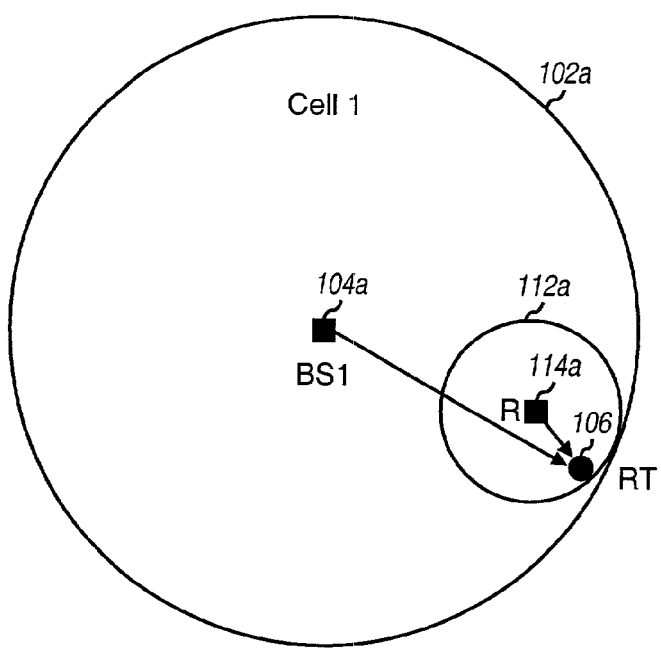

FIG. 12B is a diagram of another example of the transmissions received by a remote terminal from a base station and a repeater when the remote terminal is under the coverage of the repeater. In the example shown in FIG. 12B, remote terminal 106 receives a first transmission from base station 104a having propagation delays of $T_{BT2}$ and further receives a second transmission from repeater 114a having propagation delays of $T_{RT2}$.

For the example shown in FIG. 12B, since remote terminal 106 is under the coverage of repeater 114a, the signal strength for the transmission received from the repeater is likely to be stronger than the transmission received from the base station. Again, a series of position fixes can be generated by the PDE for the remote terminal, and the position fix having the best metric can be selected as the estimated position of the remote terminal.

Figure 13:
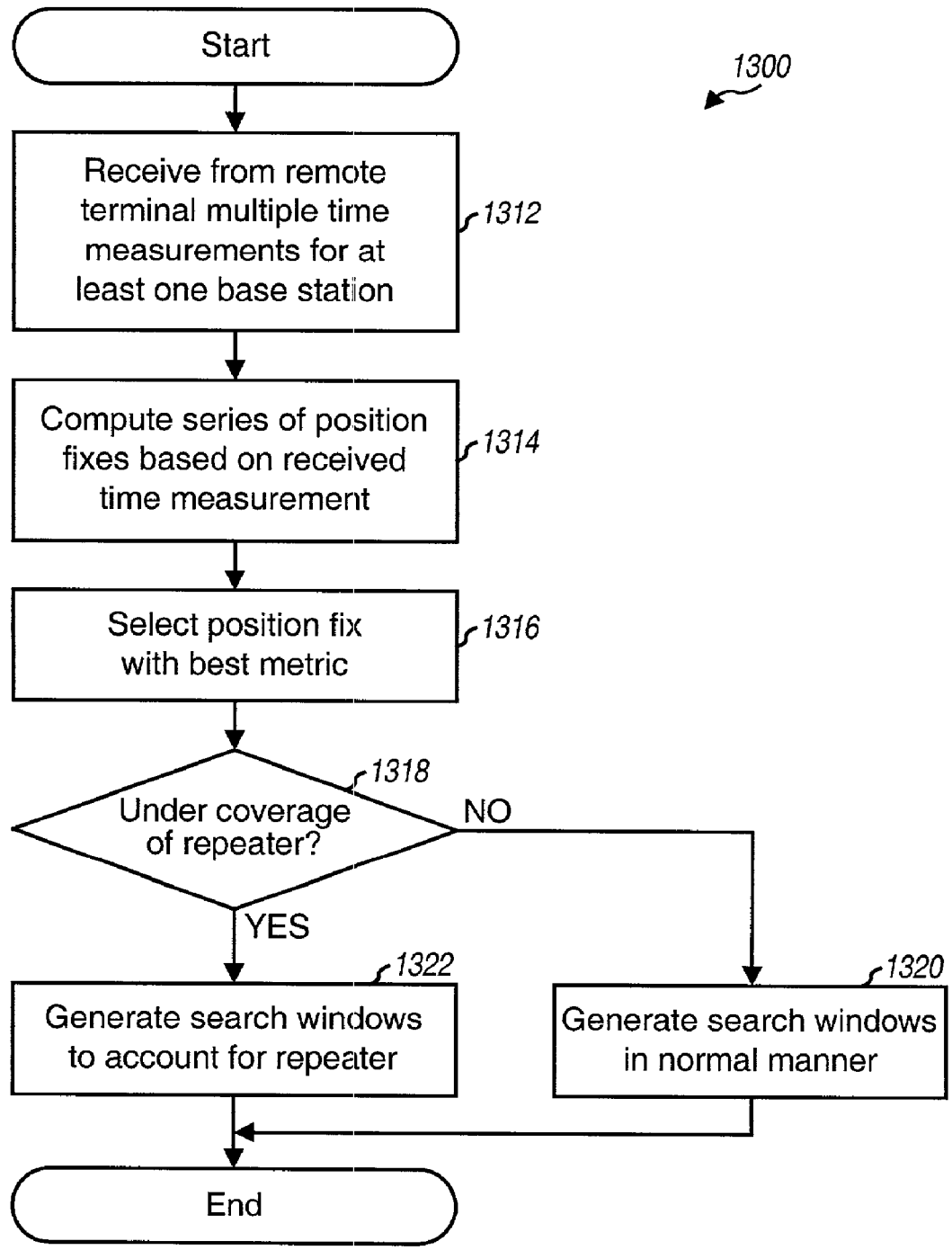
FIG. 13 is a flow diagram of an embodiment of a process for determining the position of a remote terminal based on multiple time measurements received for a repeated base station.

FIG. 13 is a flow diagram of an embodiment of a process 1300 for determining the position of a remote terminal based on multiple time measurements received for a repeated base station. Initially, the PDE receives from the remote terminal a number of time measurements for one or more base stations, with multiple time measurements being received for at least one base station, at step 1312.

The PDE computes a series of position fixes based on the received time measurements and for various combinations of the multiple time measurements received for a particular base station, at step 1314. Each computed position fix is associated with a respective metric that identifies a particular degree of confidence the computed position fix.

The position fix with the best metric is then selected as the estimated position of the remote terminal, at step 1316. For the selected position fix, a determination is then made whether or not the remote terminal is under the coverage of a repeater, at step 1318. If the answer is no, the search windows for the remote terminal are generated in the normal manner (i.e., without compensating for repeaters), at step 1320. Otherwise, if the remote terminal is estimated to be under the coverage of a repeater, the search windows are generated in a manner to account for the additional ambiguity associated with the repeater, at step 1322. This may entail widening and/or shifting the search windows depending on the delays, as described above. The process then terminates.

Position Determination Using Cost Functions

In accordance with an aspect of the invention, a determination of whether or not a remote terminal is under the coverage of a repeater can be made by calibrating the base stations and repeaters in a network. In an embodiment, as part of the calibration, the PDE is provided with information on which base station is associated with one or more repeaters, the propagation delays between the base stations and their associated repeaters, the propagation delays between repeaters, and the additional delays introduced by each repeater. This information can be stored in a table maintained by the PDE.

Table 3 is an example of a table that may be maintained by the PDE for the delays associated with repeated base stations for the example network layout shown in FIG. 1. The first column lists the transmission source (i.e., a base station or repeater) and the second column lists whether the base station is repeated. If the base station is repeated, the third column lists the propagation delays from the base station to the first repeater, or from one repeater to the next. And the fourth column lists the additional delays associated with the repeaters.

TABLE 3

| Transmission Source | Repeater Employed | Propagation Delay | Repeater Delay |
|---|---|---|---|
| Base station 104a | Yes | $T_{BR1}$ | |
| Repeater 114a | — | | $T_{R1}$ |
| Base station 104b | No | | |
| Base station 104c | Yes | $T_{BR2}$ | |
| Repeater 114b | — | $T_{BR3}$ | $T_{R2}$ |
| Repeater 114c | — | | $T_{R3}$ |

For position determination, the remote terminal receives transmissions from the base stations and repeaters in the network and reports to the PDE the time measurements for the received transmissions. In an embodiment, the remote terminal reports one time measurement for each originating base station (i.e., each unique PN offset in a CDMA network). This time measurement may be from a base station or a repeater of a repeated base station, and is typically derived from the earliest and strongest multipath from the transmission source.

The PDE receives from the remote terminal time measurements for a number of base stations (or their associated repeaters). In an embodiment, the PDE then estimates the position for the remote terminal based on the received time measurements and in accordance with a number of hypotheses. Each hypothesis is indicative of a particular guess as to the particular transmission source for each time measurement used to estimate the remote terminal's position. For example, one hypothesis assumes that all received time measurements are from the base stations and not repeaters.

The remaining hypotheses are for various combinations of base stations and repeaters for the received time measurements. For each of these hypotheses, the time measurement for each repeated base station is hypothesized to be for either the base station or a repeater. The time measurement for each hypothesized base station is then compensated by subtracting the delays associated with the transmission from the base station to the repeater and the additional delays introduced by the repeater. Each hypothesis results in one position fix and an associated error metric, which can be computed as described in the aforementioned U.S. patent application Ser. No. 09/460,180 The PDE then selects the position fix having the best metric (i.e., smallest error). From this selected position fix, a determination can be made whether or not the remote terminal is under the coverage of a repeater based on the hypothesis.

Figure 14:
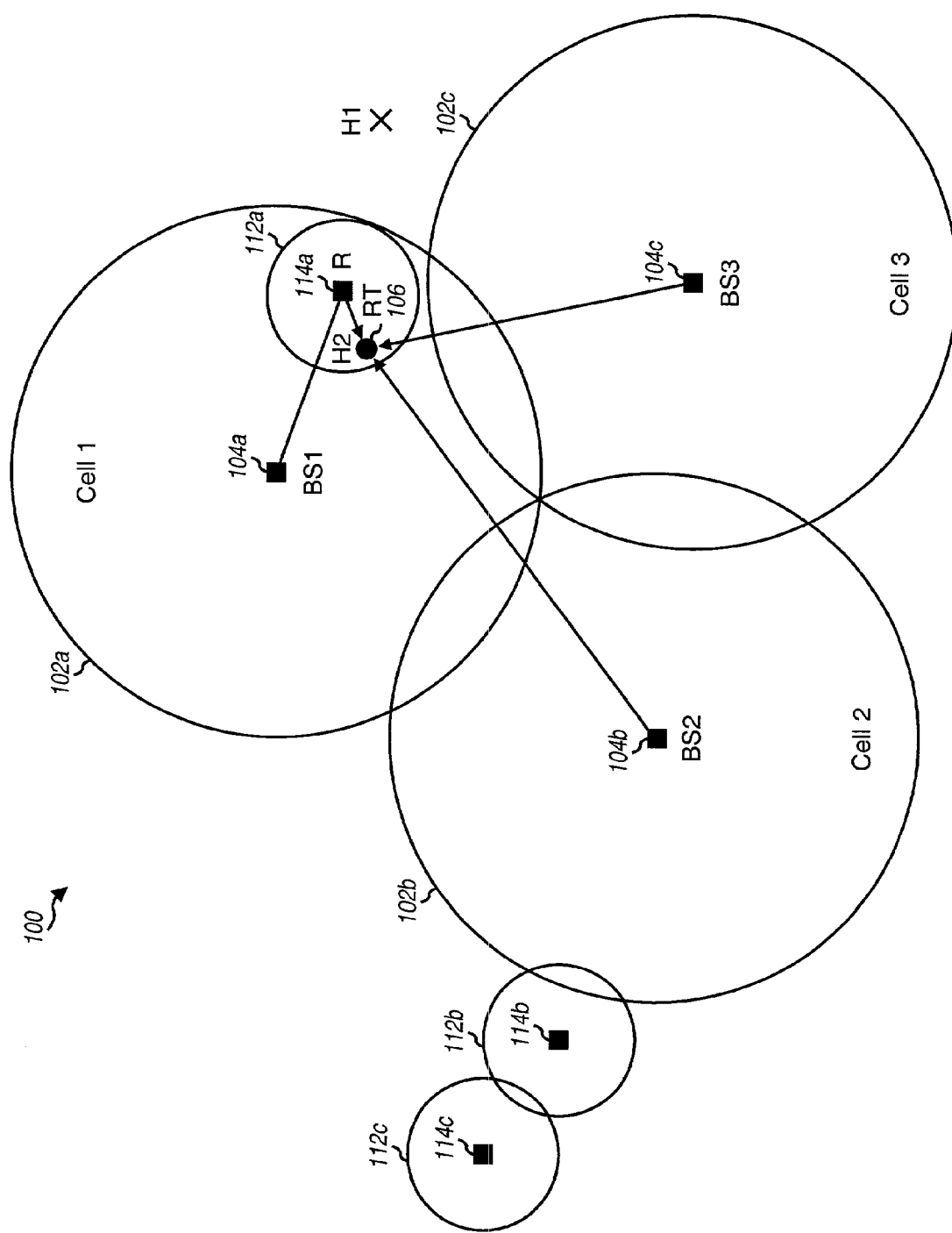
FIG. 14 is a diagram of possible position fixes computed by a PDE for time measurements reported by a remote terminal in the network layout shown in FIG. 1.

FIG. 14 is a diagram of possible position fixes computed by the PDE for time measurements reported by a remote terminal in the network layout shown in FIG. 1. In this example, the remote terminal reports time measurement for transmissions received from repeater 114a and base stations 104b and 104c. For this example, the time measurement from repeater 114a includes the propagation delays from base station 104a to repeater 114a and the additional delays associated with repeater 114a. And the time measurements from base stations 104b and 104c are indicative of direct line-of-sight measurements. These time measurements are reported to the PDE.

Base on the calibration information such as that shown in Table 3, the PDE recognizes that base stations 104a and 104b are repeated base stations. For the first hypothesis, the PDE computes the position of the remote terminal assuming that all received time measurements are from the base stations (i.e., base stations 104a, 104b, and 104c). Because of the additional delays associated with repeater 114a, the estimated range from base station 104a is further away than actuality, and the remote terminal is estimated to be located at point H1.

For the next hypothesis, the time measurement for base station 104a is assumed to be from repeater 114a and the other time measurements are assumed to be from base stations 104b and 104c. The PDE then compensates the time measurement for repeater 114a with the delays stored in the table for base station 104a and repeater 114a. In particular, the PDE subtracts the propagation delays $T_{BR1}$ from base station 104a to repeater 114a and the additional delays $T_{R1}$ introduced by repeater 114a from the time measurement for repeater 114a. The estimated position of the remote terminal for this set of hypothesized time measurements is at point H2. Another hypothesis assumes that the time measurement for base station 104b is from repeater 114a. However, the measurement from base station 104b is associated with a low signal level, and this position fix is likely to be assigned a worse metric.

Figure 15:
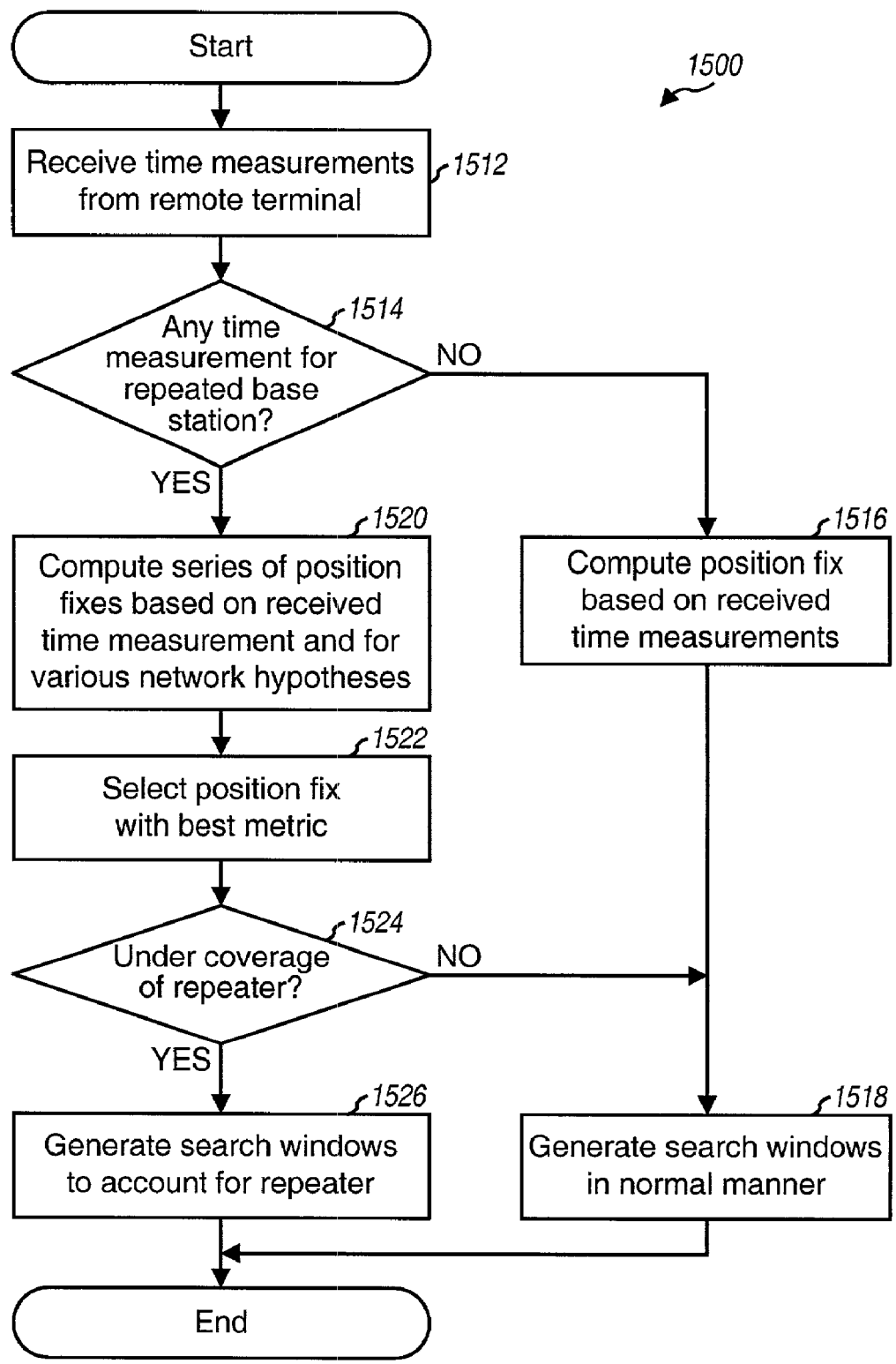
FIG. 15 is a flow diagram of an embodiment of a process for determining the position of a remote terminal based on multiple network hypotheses and cost functions.

FIG. 15 is a flow diagram of an embodiment of a process 1500 for determining the position of a remote terminal based on multiple network hypotheses and cost functions. Initially, the PDE receives time measurements from a remote terminal, at step 1512. The PDE then determines whether any of the time measurements is for a repeated base station, at step 1514. If none of the time measurements are for repeated base stations, the PDE computes the position fix of the remote terminal based on the received time measurements, at step 1516, and generates search windows for the remote terminal in the normal manner, at step 1518. The process then terminates.

Otherwise, if any of the time measurements is determined to be for a repeated base station, at step 1514, the PDE computes a series of position fixes based on the received time measurements and for various network hypotheses, at step 1520. Each network hypothesis assumes a particular transmission source for the time measurement for each repeated base station (i.e., whether from the transmission source is the base station or repeater). The computed position fix for each hypothesis is associated with a respective metric that identifies a particular degree of confidence in the computed position fix. This metric can be based on the RMSE (root mean square error).

The position fix with the best metric is then selected as the estimated position of the remote terminal, at step 1522. For the selected position fix, a determination is then made whether the remote terminal is under the coverage of a repeater, at step 1524. If the answer is no, the search windows for the remote terminal are generated in the normal manner (i.e., without compensating for repeaters), at step 1518. Otherwise, if the remote terminal is estimated to be under the coverage of a repeater, the search windows are generated in a manner to account for the additional ambiguity associated with the repeater, at step 1526. This may entail widening and/or shifting the search windows depending on the delays, as described above. The process then terminates.

System

Figure 16:
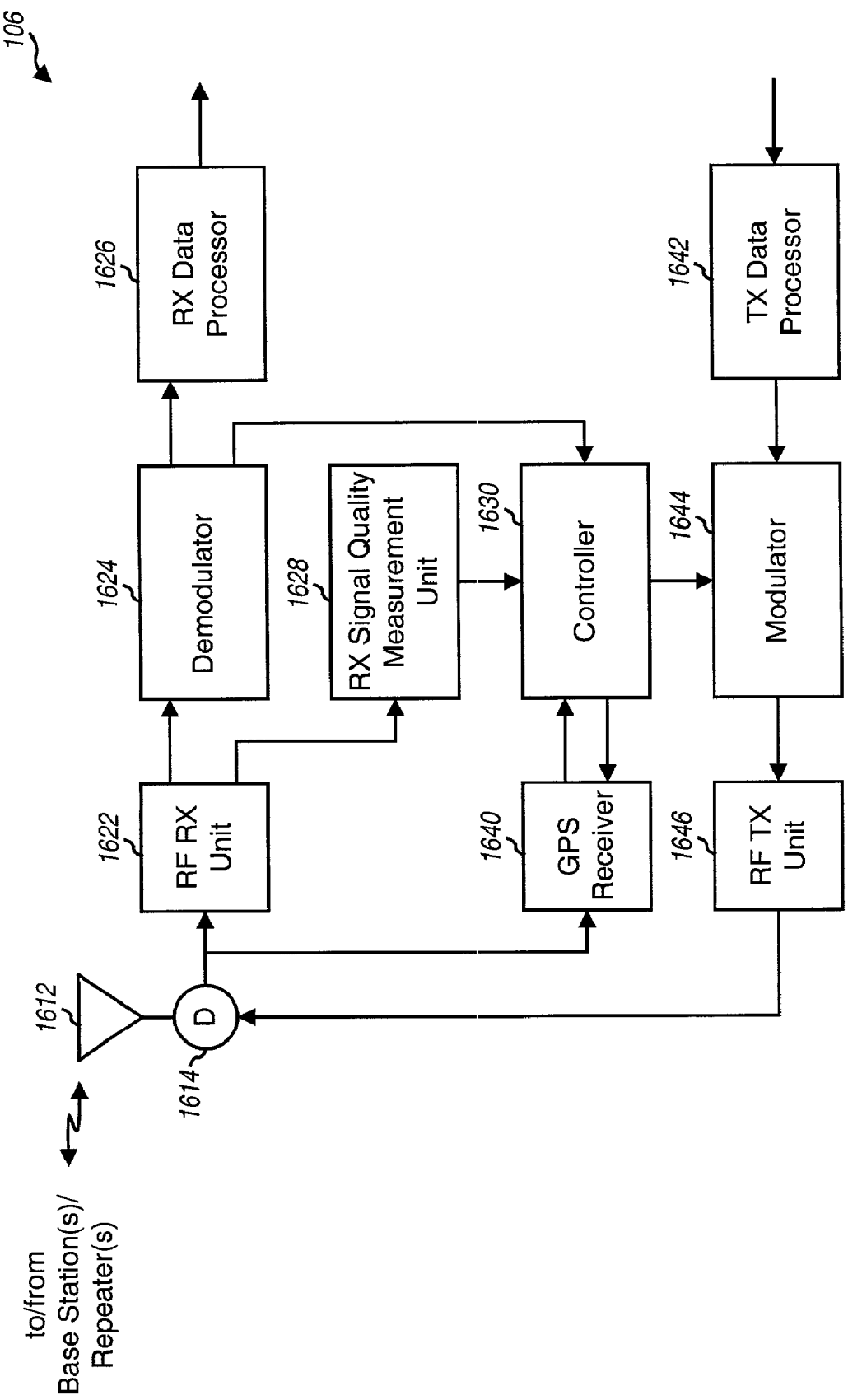
FIGS. 16 and 17 are block diagrams of an embodiment of a remote terminal and a PDE, respectively.

FIG. 16 is a block diagram of an embodiment of remote terminal 106, which is capable of implementing various aspects of the invention. On the forward link, signals from the base stations and/or repeaters are received by an antenna 1612, routed through a duplexer 1614, and provided to an RF receiver unit 1622. RF receiver unit 1622 conditions (e.g., filters, amplifies, and downconverts) and digitizes the received signal to provide samples. A demodulator 1624 receives and processes (e.g., despreads, decovers, and pilot demodulates) the samples to provide recovered symbols. Demodulator 1624 may implement a rake receiver that processes multiple instances of the received signal and generates combined recovered symbols. A receive data processor 1626 then decodes the recovered symbols, checks the received frames, and provides the output data.

For position determination, the rake receiver may be operated to provide to a controller 1630 the arrival times for the strongest received multipaths or the multipaths having signal strengths that exceed a particular threshold level. For certain embodiments, the samples from RF receiver unit 1622 may also be provided to an RX signal quality measurement unit 1628 that measures the quality of the received transmissions. The signal quality measurement can be achieved using various techniques, including those described in U.S. Pat. Nos. 5,056,109 and 5,265,119.

Controller 1630 receives the time measurements for the base stations and repeaters, the measured signal quality of the multipaths (for some embodiments), and a message indicative of the search windows sent by the PDE. The time measurements and signal quality measurements are provided to a modulator 1644 for transmission back to the PDE, and the search windows are provided to a GPS receiver 1640.

GPS receiver 1640 receives and searches for GPS signals based on the search windows provided by controller 1630. The time measurements for the GPS satellites are then provided by GPS receiver 1640 to controller 1630, which then forwards the information to the PDE.

On the reverse link, data is processed (e.g., formatted, encoded) by a transmit (TX) data processor 1642, further processed (e.g., covered, spread) by a modulator (MOD) 1644, and conditioned (e.g., converted to analog signals, amplified, filtered, quadrature modulated, and so on) by an RF TX unit 1646 to generate a reverse link signal. The information from controller 1630 may be multiplexed with the processed data by modulator 1644. The reverse link signal is then routed through duplexer 1614 and transmitted via antenna 1612 to the base stations and/or repeaters.

Figure 17:
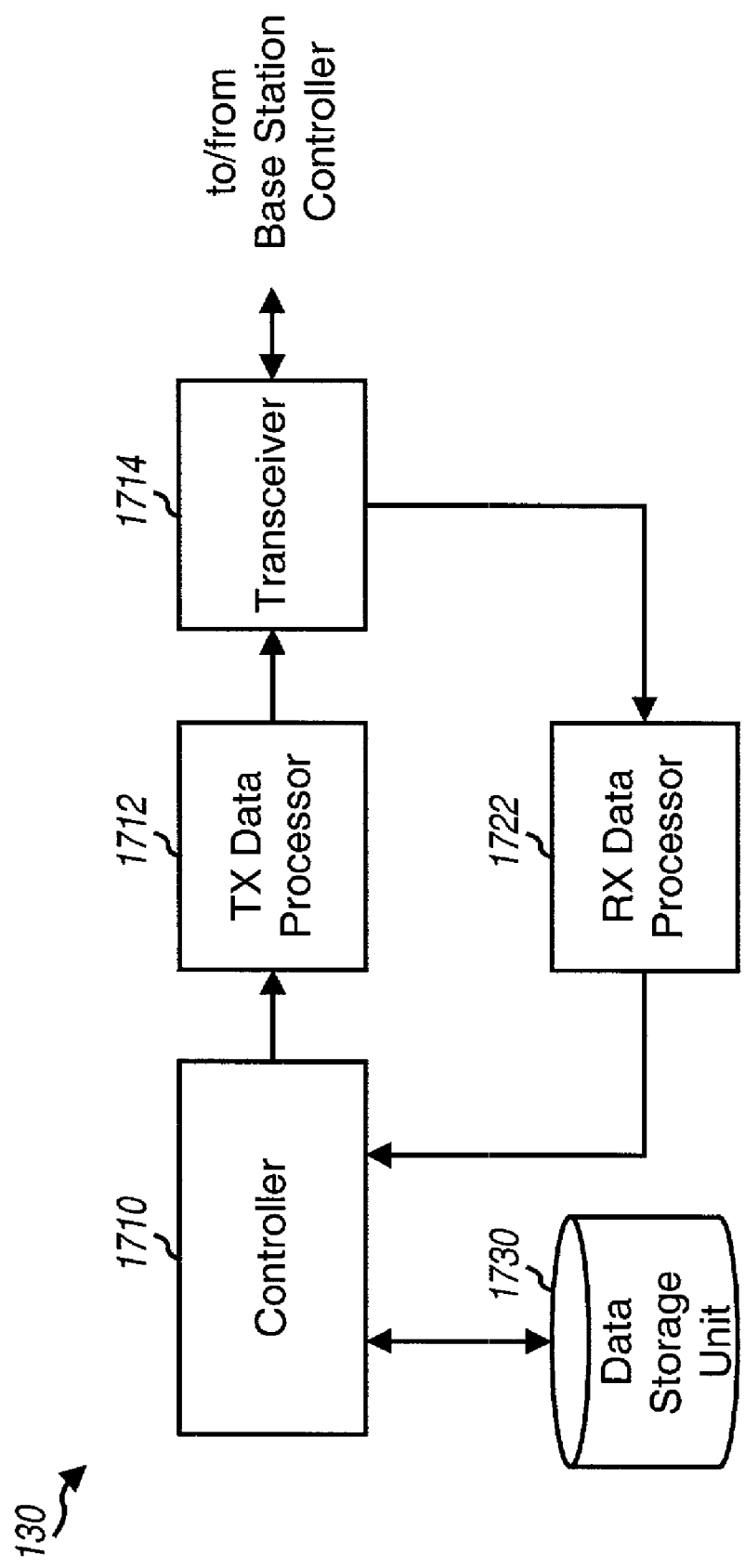

FIG. 17 is a block diagram of an embodiment of PDE 130, which is capable of implementing various aspects of the invention. PDE 130 interfaces with BSC 120 and exchanges information related to position determination.

On the reverse link, data from the base stations is provided via a transceiver 1714 to a RX data processor 1722. This data includes the time measurements and (possibly) the signal quality indications reported by the remote terminals, the time measurements for GPS satellites reported by the base stations, and other data. Data processor 1722 extracts the time measurements and signal quality indications from the received data and provides the information to a controller 1710. Controller 1710 may also receive additional data from a data storage unit 1730 (i.e., information indicating whether a base station is repeated, the delays associated with the base stations and repeaters, and so on) and computes a position estimate for a remote terminal. Controller further computes search windows for the remote terminal based on available information. The search windows are provided to a TX data processor 1712, which properly formats and sends the data to the BSC via transceiver 1714.

The processing units described herein (e.g., the rake receiver, data processors, controllers, and others) can be implemented in various manners. For example, each of these processing units can be implemented in an application specific integrated circuit (ASIC), a digital signal processor, a microcontroller, a microprocessor, or other electronic circuits designed to perform the functions described herein. The processing units can also be integrated into one or more integrated circuits. Also, the processing units can be implemented with a general-purpose or specially designed processor operated to execute instruction codes that achieve the functions described herein.

Various aspects of the invention may also be implemented in software code executed on a processor. For example, the computation to estimate the position of the remote terminal based on time measurements from the remote terminal and to generate the search windows based on the estimated position of the remote terminal may be achieved by one or more software modules. Thus, at least some of the processing and computations described her(in may be implemented using hardware, software, or a combination thereof.

For clarity, the position determination is described as being performed by the PDE. However, the processing to estimate position may also be performed at the base station, the remote terminal, or distributed between the PDE, base station, and remote terminal.

For clarity, section headings are used herein to organize various aspects of the invention. It is to be noted that the features described under these various section headings are not intended to be restricted to the section under which they are described, and techniques from two or more sections may be combined. For example, the determination of whether or not a remote terminal is under the coverage of a repeater may be made based on the probable neighbor list, the environment type of the repeater, the delays in the time measurements, the cost functions, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for determining a position of a remote terminal in a wireless communication network having included therein a plurality of transmitting sources, the method comprising:

obtaining a set of time measurements for a set of transmitting sources, wherein each time measurement is derived based on a transmission received at the remote terminal from a respective transmitting source that is either an origination source or a repeater associated with the origination source;

identifying a particular origination source for each received time measurement;

generating and maintaining a probable origination source list;

comparing a list of originating sources for the received time measurements against the list of probable origination sources for each of at least one repeater in the network;

determining whether the remote terminal is under a coverage of a particular repeater based on a result of the comparing;

assigning a weighted value to a result of the step of determining wherein the weighted value comprises delays introduces by the at least one repeater; and calculating the position of the remote terminal based on the time measurements and the assigned weighted value.

2. The method of claim 1, further comprising:

prior to the comparing, estimating whether the remote terminal is under the coverage of a repeater in the network.

3. The method of claim 1, wherein the step of generating and maintaining comprises:

forming a list of probable origination sources for each repeater within the network.

4. The method of claim 3, wherein the list of probable origination sources for each repeater is formed via empirical measurements at various locations within a coverage area of the repeater.

5. The method of claim 3, wherein the list of probable origination sources for each repeater is formed via measurements received from remote terminals operating within a coverage area of the repeater.

6. The method of claim 1, wherein the origination sources are base stations of a CDMA communication network.

7. A method for determining a position of a remote terminal in a wireless communication network having included therein a plurality of transmitting sources, wherein each transmitting source is either an origination source for a transmission or a repeater associated with the origination source, the method comprising:

cataloging an environment type for each repeater within the network;

generating a probable neighbor list for each repeater from the cataloged environmental types;

obtaining a set of time measurements for a set of transmitting sources, wherein each time measurement is derived based on a transmission received at the remote terminal from either an origination source or its associated repeater;

determining whether the remote terminal is under a coverage of a particular repeater based on the generated probable neighbor list and the received time measurements;

assigning a weighted value to a result of the step of determining wherein the weighted value comprises delays introduces by the particular repeater; and calculating the position of the remote terminal based on the time measurements and the assigned weighted value.

8. The method of claim 7, further comprising:

for each origination source within the network, identifying whether or not the origination source is associated with at least one repeater.

9. The method of claim 7, wherein the environment type for each repeater is cataloged based on a list of origination sources that may be received while under the coverage of the repeater.

10. The method of claim 7, wherein the remote terminal is determined to be under the coverage of the particular repeater if the received time measurements are derived from a limited number of origination sources.

11. The method of claim 7, wherein the remote terminal is determined to be under the coverage of the particular repeater if the received time measurements are derived from one or two origination sources.

12. A method for determining a position of a remote terminal in a wireless communication network having included therein a plurality of transmitting sources, the method comprising:

obtaining at least one time measurement for at least one transmitting source, wherein each received time measurement is derived based on a transmission received at the remote terminal from a transmitting source that is either an origination source or a repeater associated with the origination source;

generating an maintaining a list of known or estimated propagation delays for each transmitting source;

determining a propagation delays associated with each received time measurement;

comparing the propagation delays for each received time measurement against a predetermined threshold value of the known or estimated propagation delays;

determining whether the remote terminal is under a coverage of a particular repeater based on a result of the comparing;

assigning a weighted value to a result of the step of determining wherein the weighted value comprises delays introduces by the repeater; and calculating the position of the remote terminal based on the time measurements and the assigned weighted value.

13. The method of claim 12, wherein the threshold value for a particular origination source is derived based in part on an expected worst case propagation delays for a transmission from the origination source to a particular remote terminal located within the coverage of the origination source.

14. The method of claim 12, wherein the threshold value for a particular origination source is derived based in part on an expected best case propagation delays for a transmission from the origination source via a repeater to a particular remote terminal located within the coverage of the repeater.

15. The method of claim 12, wherein the threshold value for a particular origination source is selected to reduce a likelihood of erroneously identifying the remote terminal as being under the coverage of a repeater associated with the origination source.

16. A method for determining a position of a remote terminal in a wireless communication network having included therein a plurality of transmitting sources, the method comprising:

obtaining a set of time measurements for a set of transmitting sources, wherein each time measurement is derived based on a transmission received at the remote terminal from a transmitting source that is either an origination source or a repeater associated with the origination source;

identifying a particular origination source for each received time measurement;

generating and maintaining a list of origination sources and whether each of the origination sources employ at least one repeater;

determining whether the identified origination source for each received time measurement is associated with a repeater;

discarding time measurements for selected ones of origination sources determined to be associated with repeaters; and determining an initial position estimate for the remote terminal based on remaining time measurements not discarded.

17. The method of claim 16, further comprising:
retaining time measurement for a reference origination source even if the reference origination source is associated with a repeater.

18. The method of claim 16, further comprising:
determining whether an origination source not associated with a repeater is available for selection as a reference origination source for the remote terminal.

19. The method of claim 18, further comprising:
discarding time measurements for origination sources associated with repeaters if at least one origination source not associated with a repeater is available for selection as the reference origination source for the remote terminal.

20. The method of claim 18, further comprising:
retaining time measurements for origination sources associated with repeaters if no origination source not associated with a repeater is available for selection as the reference origination source for the remote terminal.

21. The method of claim 16, further comprising:
generating one or more search windows for the remote terminal based on the initial position estimate for the remote terminal, wherein each search window is used to search for a respective GPS satellite.

22. A method for determining a position of a remote terminal in a wireless communication network having included therein a plurality of transmitting sources, the method comprising:

obtaining a set of time measurements for a set of transmitting sources, wherein each time measurement is derived based on a transmission received at the remote terminal from a transmitting source that is either an origination source or a repeater associated with the origination source;

identifying a particular origination source for each received time measurement;

determining an initial position estimate for the remote terminal based on the received time measurements;

generating and maintaining a list of origination sources and whether each of the origination sources employ at least one repeater;

determining whether the origination source for at least one time measurement used to determine the initial position estimate for the remote terminal is associated with a repeater;

assigning a weighted value to a result of the step of determining wherein the weighted value comprises delays introduced by the at least one repeater; and generating one or more search windows for the remote terminal based on the initial position estimate for the remote terminal, wherein each search window is used to search for a respective GPS satellite.

23. The method of claim 22, further comprising:
compensating the one or more search windows if any time measurement used to determine the initial position estimate for the remote terminal is derived from an origination source associated with a repeater.

24. The method of claim 23, wherein the compensating includes
widening at least one search window to account for ambiguity due to the repeater.

25. The method of claim 23, wherein the compensating includes
adjusting a time offset for at least one search window.

26. The method of claim 22, wherein the search window for a particular GPS satellite is derived based on estimated closest and furthest distances between the remote terminal and the GPS satellite.

27. The method of claim 26, wherein the estimated closest and furthest distances between the remote terminal and the GPS satellite account for ambiguity due to at least one time measurement, used to determine the initial position estimate for the remote terminal, being derived from an origination source associated with a repeater.

28. The method of claim 22, wherein a time offset associated with the search window for a particular GPS satellite is derived based on an estimated average distance between the remote terminal and the GPS satellite.

29. A method for determining a position of a remote terminal in a wireless communication network having included therein a plurality of transmitting sources, the method comprising:
 obtaining a set of time measurements for a set of transmitting sources, wherein each time measurement is derived based on a transmission received at the remote terminal from a transmitting source that is either an origination source or a repeater associated with the origination source, and wherein a plurality of time measurements are received for a plurality of transmissions from a particular origination source or its associated repeater;
 computing a plurality of position estimates based on the received time measurements;
 associating each computed position estimate with the plurality of computed position estimates with a predetermined confidence value wherein said confidence value comprises delays introduced by the repeater associated with the origination source; and
 selecting one of the computed position estimates based the step of associating as an initial position estimate for the remote terminal.

30. The method of claim 29, further comprising:
 deriving a metric for each computed position estimate, and
 wherein the computed position estimate having a best metric is selected as the initial position estimate for the remote terminal.

31. A method for determining a position of a remote terminal in a wireless communication network having included therein a plurality of transmitting sources, the method comprising:
 obtaining a set of time measurements for a set of transmitting sources, wherein each time measurement is derived based on a transmission received at the remote terminal from a transmitting source that is either an origination source or a repeater associated with the origination source;
 computing a plurality of position estimates based on the received time measurements and a plurality of network hypotheses, wherein each network hypothesis corresponds to a respective combination of origination sources and repeaters hypothesized to be the transmitting sources for the plurality of time measurements used to compute the position estimate for remote terminal;
 hypothesizing whether the transmitting source is a origination source or a repeater source a result from the each network hypothesis; and
 selecting one of the computed position estimates as an initial position estimate for the remote terminal based on the step of computing and the step of determining.

32. The method of claim 31, further comprising:
 for each network hypothesis, if a particular time measurement is hypothesized to be from a repeater and not an origination source, compensating for delays associated with the repeater.

33. The method of claim 32, wherein the compensating for delays associated with a particular repeater includes subtracting out a propagation delays between the repeater and the associated origination source, and
 subtracting out a second delays introduced by the repeater.

34. The method of claim 31, further comprising:
 deriving a metric for each computed position estimate, and
 wherein the computed position estimate having a best metric is selected as the initial position estimate for the remote terminal.

35. The method of claim 34, wherein the metric for each computed position estimate is based on a signal strength associated with each received time measurement used to compute the position estimate.

36. The method of claim 31, wherein each received time measurement is derived from a respective and different origination source.

37. The method of claim 31, further comprising:
 generating one or more search windows based on the initial position estimate for the remote terminal, wherein each search window is used to search for a respective GPS satellite.

38. The method of claim 37, further comprising:
 deriving a final position estimate for the remote terminal based on one or more time measurements from one or more GPS satellites.

39. A remote terminal in a wireless communication network, comprising:
 a receiver unit configured to receive, process, and digitize a received signal to provide samples;
 a demodulator coupled to the receiver unit and configured to receive and process the samples to provide a set of time measurements for a set of transmitting sources, wherein each time measurement is derived based on a transmission received at the remote terminal from a respective transmitting source that is either an origination source or a repeater associated with the origination source;
 a controller operatively coupled to the demodulator and configured to receive the time measurements and further configured to receive or derive one or more search windows based on an initial position estimate for the remote terminal, wherein each search window is used to search for a respective GPS satellite; and
 a GPS receiver operatively coupled to the controller and configured to search for one or more GPS satellites in accordance with the one or more search windows.

40. The remote terminal of claim 39, further comprising:
 a signal quality measurement unit operatively coupled to the demodulator and configured to derive an estimate of a signal strength for each transmission used to derive a time measurement.

41. The remote terminal of claim 39, further comprising:
 a modulator operatively coupled to the controller and configured to receive and process the set of time measurements; and
 a transmitter unit operatively coupled to the modulator and configured to transmit the set of time measurements.

42. A processing unit in a wireless communication network, comprising:
 a transceiver configured to exchange data with a network entity;
 a receive data processor coupled to the transceiver and configured to receive from a remote terminal a set of time measurements for a set of transmitting sources, wherein each time measurement is derived based on a transmission received at the remote terminal from a transmitting source that is either an origination source or a repeater associated with the origination source; and a controller coupled to the receive data processor and configured to determine whether the remote terminal is under a coverage of a repeater within the network and to derive an initial position estimate for the remote terminal based on the received time measurements.

43. The processing unit of claim 42, wherein the controller is further configured to generate one or more search windows for the remote terminal based on the initial position estimate for the remote terminal, wherein each search window is used to search for a respective GPS satellite, the processing unit further comprising:

a transmit data processor coupled to the controller and the transceiver and configured to receive and forward the one or more generated search windows to the transceiver for transmission to the remote terminal.

44. The processing unit of claim 42, wherein the controller is further configured to compute a plurality of position estimates based on the received time measurements and a plurality of network hypotheses, wherein each network hypothesis corresponds to a respective combination of origination sources and repeaters hypothesized to be the transmitting sources for the plurality of time measurements used to compute the position estimate for remote terminal, and select one of the plurality of computed position estimates as the initial position estimate for the remote terminal.

45. The processing unit of claim 42, further comprising:

a data storage unit configured to store a list of probable origination sources for each repeater within the network, and wherein the controller is further configured to determine whether the remote terminal is under the coverage of a particular repeater in the network by comparing a list of originating sources for the received time measurements against the list of probable origination sources for each repeater within the network.

* * * * *